(12) United States Patent
Mandloi et al.

(10) Patent No.: US 12,008,632 B2
(45) Date of Patent: Jun. 11, 2024

(54) METHODS AND SYSTEMS FOR RECOVERING A FAILED PAYMENT PROCESSING REQUEST

(71) Applicant: Mastercard International Incorporated, Purchase, NY (US)

(72) Inventors: Abhay Mandloi, Pune (IN); Rajeev Kumar, Pune (IN); Aravindan Ramamoorthy, Coimbatore (IN)

(73) Assignee: Mastercard International Incorporated, Purchase, NY (US)

( * ) Notice: Subject to any disclaimer, the term of this patent is extended or adjusted under 35 U.S.C. 154(b) by 367 days.

(21) Appl. No.: 17/397,584

(22) Filed: Aug. 9, 2021

(65) Prior Publication Data
US 2022/0067819 A1   Mar. 3, 2022

(30) Foreign Application Priority Data
Sep. 3, 2020  (IN) .............................. 202041038056

(51) Int. Cl.
*G06Q 30/00* (2023.01)
*G06F 11/14* (2006.01)
(Continued)

(52) U.S. Cl.
CPC ..... *G06Q 30/0641* (2013.01); *G06F 11/1474* (2013.01); *G06Q 20/02* (2013.01);
(Continued)

(58) Field of Classification Search
CPC .. G06Q 30/0641; G06Q 20/401; G06F 9/451; G06F 11/1474; G06F 2201/805
See application file for complete search history.

(56) References Cited

U.S. PATENT DOCUMENTS

| 2001/0014954 A1* | 8/2001 | Purcell ................ G06F 11/2007 714/E11.078 |
| 2013/0031068 A1* | 1/2013 | Kumar .................... G06F 16/40 707/703 |
| 2021/0241267 A1* | 8/2021 | Mahajan ............ G06Q 20/4093 |

OTHER PUBLICATIONS

Sharma, Archana, and Vineet Kansal. "An analysis of mobile transaction methods and limitations in execution of m-commerce transaction." International Journal of Computer Applications 43.21 (2012): 14-19.*

* cited by examiner

*Primary Examiner* — Kathleen Palavecino
(74) *Attorney, Agent, or Firm* — Hovey Williams LLP

(57) ABSTRACT

Embodiments provide methods and systems for recovering a failed payment processing request. Method includes receiving, by a server system associated with a payment network, a transaction recovery request signal initiated from a User Interface (UI) of a merchant application running on a user device for recovering a payment transaction failed due to a disconnection between the server system and a merchant server. The request signal includes a unique ID associated with the payment transaction. The method includes electronically retrieving a corresponding transaction information stored against the unique ID. The transaction information includes a transaction status. The unique ID is sent in advance by the merchant server along with a transaction amount. The method includes identifying the transaction status as an approved payment transaction. The method includes sending a confirmation notification signal including the transaction status to the merchant server. The merchant server is configured to complete the payment transaction.

20 Claims, 20 Drawing Sheets

(51) Int. Cl.
*G06Q 20/02* (2012.01)
*G06Q 20/12* (2012.01)
*G06Q 20/40* (2012.01)
*G06Q 20/42* (2012.01)
*G06Q 30/0601* (2023.01)

(52) U.S. Cl.
CPC ........... *G06Q 20/12* (2013.01); *G06Q 20/401* (2013.01); *G06Q 20/42* (2013.01); *G06F 2201/805* (2013.01)

| | TRANSACTION INFORMATION 306 | | | |
|---|---|---|---|---|
| UNIQUE ID 308 | TRANSACTION AMOUNT 302a | PAYMENT METHOD INFORMATION 302b | TRANSACTION STATUS 302c | LOGIN ID 302d |
| 123456XYZ 310 | 1000 INR 304a | XXXX 3728 304b | - 304c | XYZ@ECOMMERCE.COM 304d |

FIG. 3

| | TRANSACTION INFORMATION 306 | | | |
|---|---|---|---|---|
| UNIQUE ID 308 | TRANSACTION AMOUNT 302a | PAYMENT METHOD INFORMATION 302b | TRANSACTION STATUS 302c | LOGIN ID 302d |
| 123456XYZ 310 | 1000 INR 304a | XXXX 3728 304b | APPROVED 502a | XYZ@ECOMMERCE.COM 304d |

302 → (row 1)
502 → (row 2)

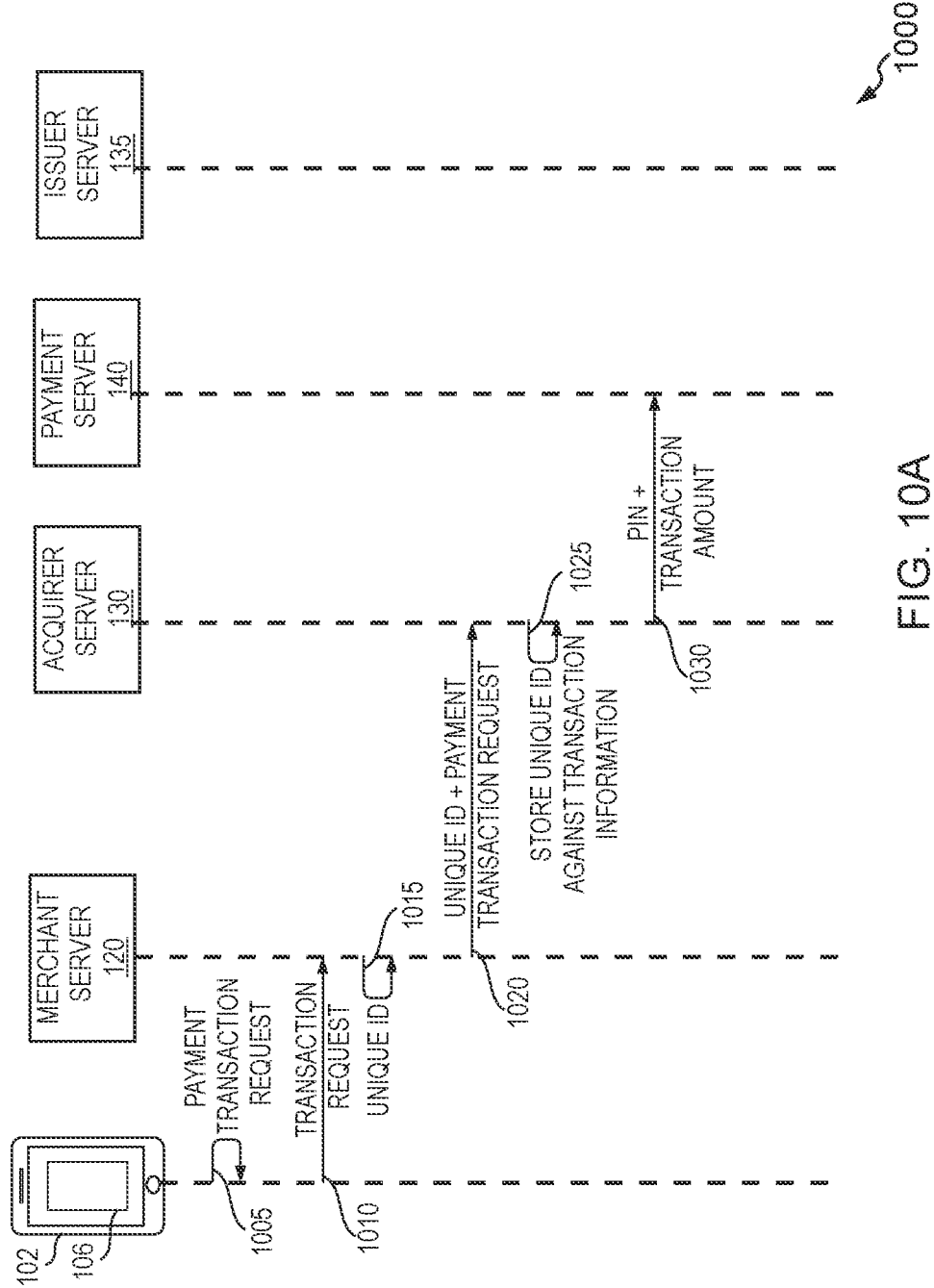

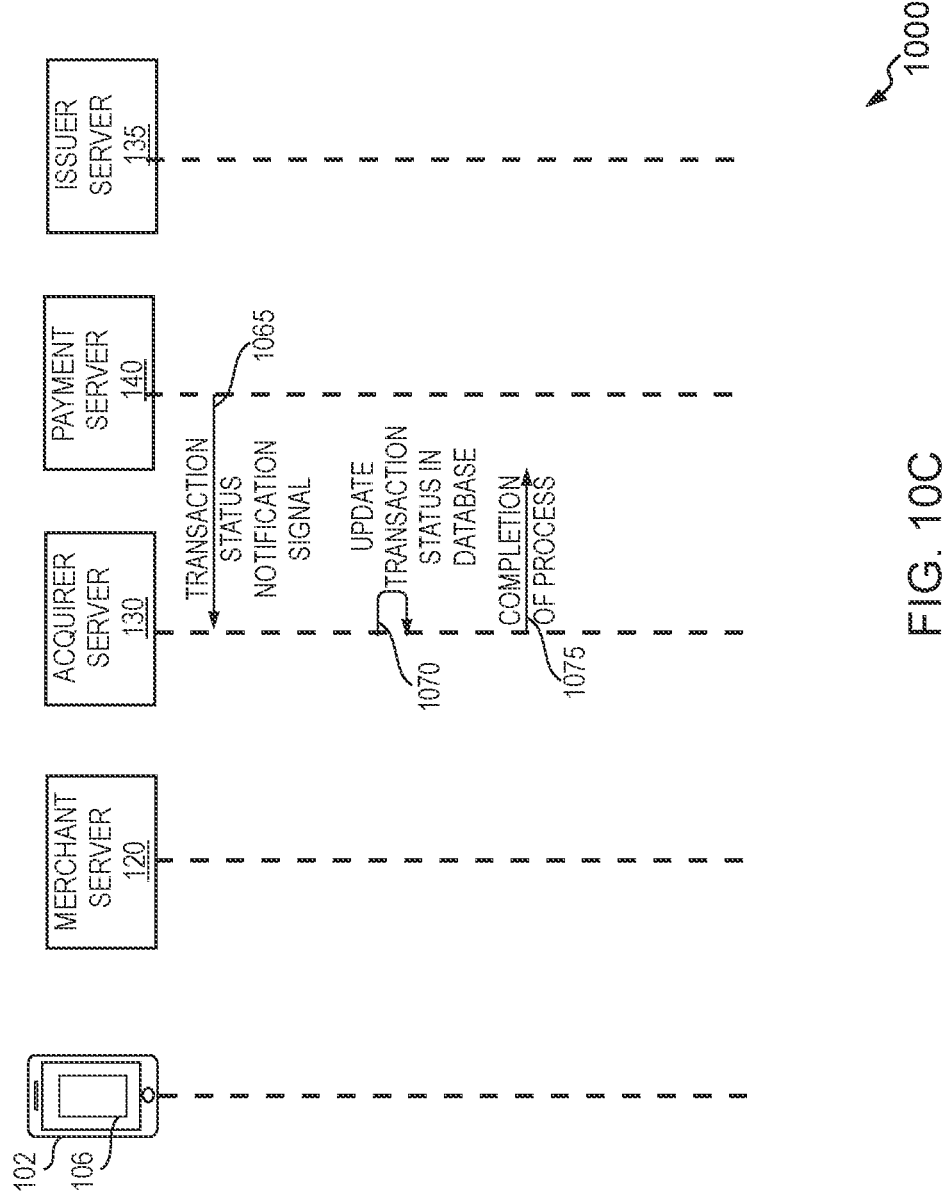

METHODS AND SYSTEMS FOR RECOVERING A FAILED PAYMENT PROCESSING REQUEST

CROSS REFERENCE TO RELATED APPLICATIONS

This application claims priority to Indian Application No. 202041038056, filed Sep. 3, 2020, which is incorporated herein by reference in its entirety

TECHNICAL FIELD

The present disclosure relates to processing electronic payment of goods and/or services in a payment transaction management network and, more particularly to, methods and systems for recovering failed e-commerce payment processing requests.

BACKGROUND

Generally, purchasing a product over the Internet involves the electronic submission of a payment card number (e.g., credit cards and debit cards) on a merchant e-commerce website, an electronic communication to the payment card issuer for authorization of a total purchase price, and an electronic debiting of the customer's account when the authorization is successful. Payment interchange networks (hereinafter alternatively referred to as "payment network") facilitate the exchange of financial transaction data between financial institutions that are members/customers of the payment interchange networks for processing payment card based transactions. Examples of the members include the issuer banks, the acquirer banks, wallet application providers and the like. A payment service provider (PSP) or a payment gateway (another example of a member of the payment network) offers online services to merchants for accepting electronic payments by a variety of payment methods including credit card, bank-based payments such as bank transfer, and online banking. Non-Payment Card Industry (PCI) compliant merchants are unauthorized to handle the payment transactions themselves. Such merchants need to link with the PSP to process the payment transactions on behalf of the merchants.

A normal transaction flow for a successfully completed e-commerce transaction using a linked PSP involves selecting the product from a merchant portal by a user, being redirected to the payment gateway for providing the card details, forwarding of the card details to the issuer via the acquirer for the authorization etc. Further, if the issuer authorizes the transaction successfully, electronic debiting of the user account is processed next. Thereafter, a response of an approved transaction is sent back to the merchant via the acquirer and the payment gateway so that the merchant can dispatch product purchased by the user. Sending response of an approved transaction to the merchant server is the last leg of the transaction where the transaction is processed by respective entities of the payment network successfully. However, in the event of the connection between the acquirer server or the payment gateway server (if appointed) being broken, the merchant and the user may not be notified about the successful authorization of the transaction.

There are many scenarios, when the link between entities involved during the last leg of the transaction (i.e., the acquirer and the merchant server) is disconnected. If the payment gateway is involved between the merchant server and the acquirer, there may be scenarios when the link between the payment gateway and the merchant server is disconnected. A message is sent on the user device displaying text, 'your transaction could not be completed, and the amount will be refunded back to your account.' This may be due to network connectivity issues between the participating entities. The session gets failed due to a time-out occurrence as one of the entities is unreachable. In other scenarios, the user may also intentionally cancel the transaction by closing the bowser window. Also, the user may hit 'refresh' or 'back' button accidently while waiting for the transaction to get completed on the browser window. However, in these scenarios, the actual transaction may have been successful, but only without the merchant server not being aware of the successful status of the transaction.

When an otherwise approved transaction gets failed due to the reasons mentioned above, the user has to perform the transaction again to get the same product. Further, it is possible that by the time the user performs the transaction again, the same product is no longer available. Also, the user has to block some additional money for redoing the transaction. The user also has to call the issuer to release the funds that were blocked during the earlier failed transaction. This results in a deteriorating user experience. Further, the merchant also is left unknown about when to complete the transaction.

Accordingly, techniques are desired for recovering a payment transaction that is approved, however, failed due to a disconnection between the merchant server and the acquirer server or the payment gateway server, as the case be, such that the merchant is enabled to complete the payment transaction and the user is enabled to receive the purchased product or services without delay.

SUMMARY

Various embodiments of the present disclosure provide systems, methods, electronic devices and computer program products for recovering a failed payment transaction.

In an embodiment, a computer-implemented method is disclosed. The method includes receiving, by a server system associated with a payment network, a transaction recovery request signal initiated from a User Interface (UI) of a merchant application running on a user device for recovering a payment transaction failed due to a disconnection between the server system and a merchant server. The transaction recovery request signal includes a unique Identifier (ID) associated with the payment transaction. The method includes electronically retrieving, by the server system, a corresponding transaction information stored against the unique ID. The transaction information includes a transaction status of the payment transaction and the unique ID is sent in advance by the merchant server along with a transaction amount at a time of processing the payment transaction. The method includes identifying, by the server system, the transaction status of the payment transaction as an approved payment transaction. The method includes sending, by the server system, a confirmation notification signal including the transaction status of the payment transaction as the approved payment transaction to the merchant server. The merchant server is configured to complete the payment transaction failed due to the disconnection between the server system and the merchant server based on the confirmation notification signal received from the server system.

In another embodiment, a server system in a payment network is provided. The server system includes a communication interface configured to receive a transaction recovery request signal initiated from a UI of a merchant application running on a user device for recovering a payment transaction failed due to a disconnection between the server system and a merchant server. The transaction recovery request signal includes a unique ID associated with the payment transaction. The server system further includes a memory including executable instructions and a processor communicably coupled to the communication interface. The processor is configured to execute the instructions to cause the server system at least electronically retrieve a corresponding transaction information stored against the unique ID. The transaction information includes a transaction status of the payment transaction and the unique ID is sent in advance by the merchant server along with a transaction amount at a time of processing the payment transaction. The processor is further configured to execute the instructions to cause the server system to identify the transaction status of the payment transaction as an approved payment transaction. The processor is further configured to execute the instructions to cause the server system to send a confirmation notification signal including the transaction status of the payment transaction as the approved payment transaction to the merchant server. The merchant server is configured to complete the payment transaction failed due to the disconnection between the server system and the merchant server based on the confirmation notification signal received from the server system.

In yet another embodiment, a server system in a payment network is disclosed. The server system includes a communication module configured to electronically facilitate display of a UI of a merchant application on a user device. The communication module is further configured to receive a transaction recovery request signal initiated from the UI for recovering a payment transaction failed due to a disconnection between the server system and a payment gateway server. The server system further includes a memory including executable instructions and a processing module communicably coupled to the communication module. The processing module is configured to execute the instructions to cause the server system at least to send the transaction recovery request signal including a unique ID associated with the payment transaction to the payment gateway server. The unique ID is sent in advance to the payment gateway server along with a transaction amount at a time of processing the payment transaction. The processing module is further configured to execute the instructions to cause the server system to receive a confirmation notification signal including a transaction status of the payment transaction as an approved payment transaction from the payment gateway server. The payment gateway server is configured to electronically retrieve a corresponding transaction information stored against the unique ID. The transaction information includes the transaction status of the payment transaction. The processing module is further configured to execute the instructions to cause the server system to electronically facilitate completion of the payment transaction failed due to the disconnection between the server system and the payment gateway server based on the confirmation notification signal received from the payment gateway server.

BRIEF DESCRIPTION OF THE FIGURES

For a more complete understanding of example embodiments of the present technology, reference is now made to the following descriptions taken in connection with the accompanying drawings in which:

FIG. 3 is a schematic representation of the unique ID stored against a corresponding transaction information in a database of a payment gateway server, in accordance with an example embodiment;

FIG. 5 is a schematic representation of the unique ID stored against an updated transaction information in the database of the payment gateway server, in accordance with an example embodiment;

FIGS. 10A, 10B and 10C, collectively, are a sequence flow diagram representing updating of a transaction status by an acquirer server against the unique ID received from the merchant server for the payment transaction, in accordance with an example embodiment;

Figure 1:
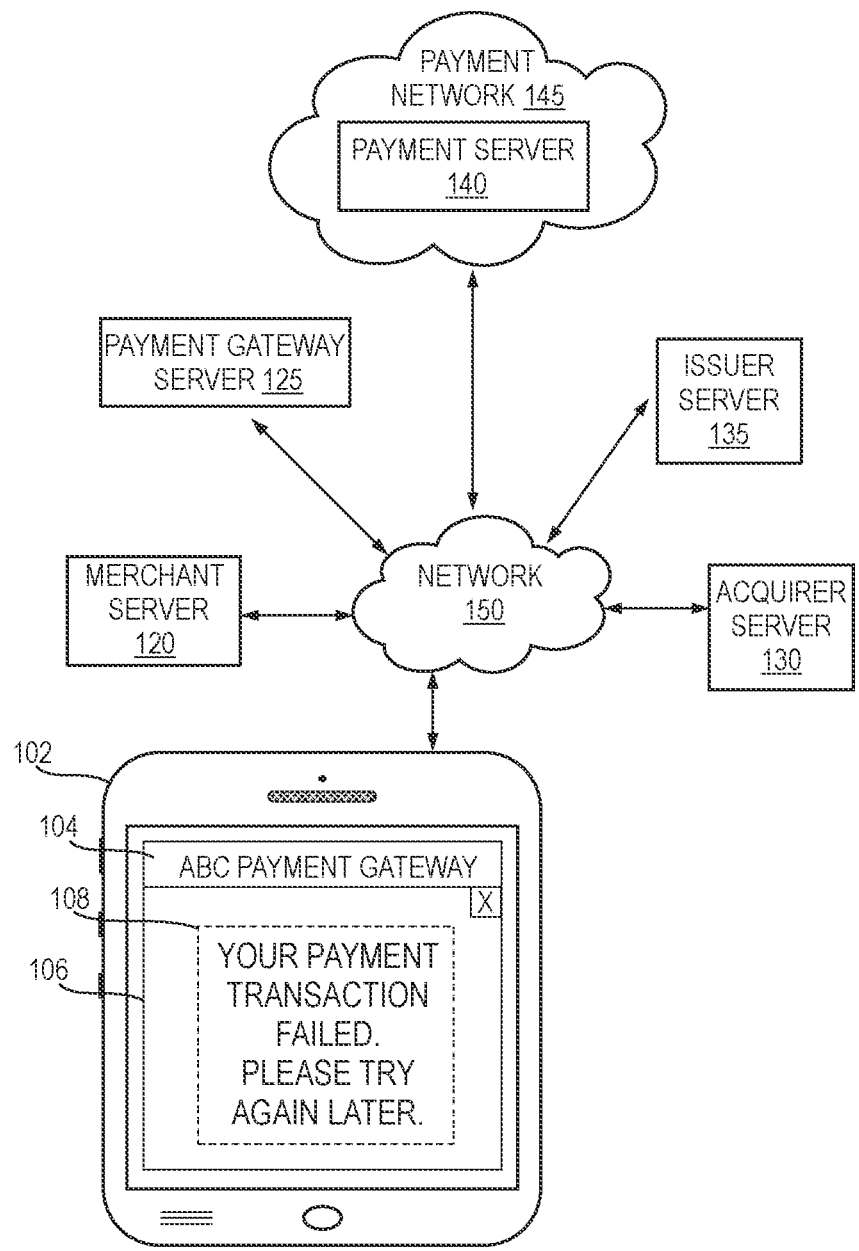
FIG. 1 illustrates an exemplary representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment account" used throughout the description refers to a financial account that is used to fund the financial transaction (interchangeably referred to as "payment transaction" or "transaction"). Examples of the payment account include, but are not limited to a savings account, a credit account, a checking account and a virtual payment account. The payment account may be associated with an entity such as an individual person, a family, a commercial entity, a company, a corporation, a governmental entity, a non-profit organization and the like. In some scenarios, a payment account may be a virtual or temporary payment account that can be mapped or linked to a primary payment account, such as those accounts managed by digital wallet or other payment application.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. One example of a payment network includes those operated by Mastercard®.

The term "payment card", used throughout the description, refers to a physical or virtual card linked with a financial or payment account that may be used to fund a financial transaction to a merchant or any such facility via the associated payment account. Examples of the payment card include, but are not limited to, debit cards, credit cards, e-wallet, prepaid cards, virtual payment numbers, virtual card numbers, forex cards, charge cards and stored-value cards. A payment card may be a physical card that may be presented to the merchant for funding the payment. Alternatively, or additionally, the payment card may be embodied in form of data stored in a user device, where the data is associated with payment account such that the data can be used to process the financial transaction between the payment account and a merchant's financial account.

The term "payment gateway", used throughout the description, refers to a merchant service to facilitate a payment transaction by the transfer of information between a payment portal (such as a website, mobile phone or interactive voice response service) and the front end processor or acquiring bank. The payment gateway may be provided by a bank to its customers, or a specialized financial service provider as a separate service, such as a Payment Service Provider (PSP). A PSP offers a single payment gateway for its clients (merchants) for accepting electronic payments by multiple payment methods including credit card, bank-based payments such as direct debit, bank transfer, and real-time bank transfer based on online banking. A PSP can connect to multiple acquiring banks, card, and payment networks. In many cases, the PSP fully manages these technical connections, relationships with the external network, and bank accounts and therefore takes care of the technical processing of payment methods for e-commerce payment transactions.

The term "approved payment transaction", (interchangeably referred to as "approved transaction") used throughout the description, refers to a payment transaction for which the following steps have taken place—the validity of a payment account of a user has been verified, availability of funds has been confirmed, and funds have moved from "available" to "pending" in the payment account of the user. This means that a hold has been placed on the amount of money charged and the user does not have access to these funds in his or her account. For example, when a credit card is keyed, swiped, or run via autopay or in the online store, the above-mentioned steps are performed to refer the credit card based payment transaction as approved transaction.

Overview

Various example embodiments of the present disclosure provide methods, systems, user devices and computer program products for recovering a failed payment processing request.

In various example embodiments, the present disclosure facilitates a merchant server (an example of a server system) in a payment network that generates a unique Identifier (ID) to be associated with a payment transaction for processing the payment transaction initiated by a user using a merchant application facilitated by the merchant server. The unique ID is dynamically generated by the merchant server for each payment transaction. Without loss of generality, the unique ID is a combination of a Primary Account Number (PAN), a transaction date, a transaction time and a transaction amount. The unique ID and the transaction amount are sent to a payment gateway server (another example of the server system) (if linked with the merchant server/appointed by a merchant) or directly to an acquirer server (yet another example of the server system) for processing the payment transaction further. The 'overview' is hereinafter explained with reference to the payment gateway server present for processing the payment transaction. However, if the payment gateway server is not present, the acquirer server acts as the server system to perform various features of the disclosure similar to the payment gateway server without deviating from the scope.

In one embodiment, the payment gateway server stores a corresponding transaction information against the unique ID. The transaction information includes the transaction amount, a transaction payment method information (e.g., payment card details, net banking details etc.), a transaction status, and a login ID associated with a user of the merchant application. The transaction amount and the transaction payment method information (e.g., PIN or password) are forwarded to an issuer server via a payment server associated with a payment network for authentication and authorization purposes. The issuer server performs a successful authentication of the user, a successful authorization of a user account, a debiting of the transaction amount from the user account and sends a transaction status notification signal to the payment gateway server via the acquirer server. The transaction status notification signal includes the transaction status of payment transaction as an approved payment transaction. The payment gateway server (or the acquirer server, if the case be) updates a corresponding entry of the transaction status stored against the unique ID in its database.

In an example scenario, the approved payment transaction, however, appears to be failed due to a disconnection between the merchant server and the payment gateway server. The disconnection may be caused to due to a broken communication link, user's accidental input to abort the transaction and the like. Therefore, the payment gateway server is unable to send a response to the merchant server about the approved payment transaction for completion of the payment transaction during the last leg of the payment transaction.

In at least one embodiment, the merchant server electronically facilitates display of a User Interface (UI) of the merchant application on the user device using which the user is enabled to initiate a transaction recovery request signal. The transaction recovery request signal includes the unique ID associated with the payment transaction. The merchant server sends the transaction recovery request signal including the unique ID to the payment gateway server. The payment gateway server electronically retrieves the corresponding transaction information stored against the unique ID that further includes the updated transaction status of the payment transaction. The payment gateway server identifies the transaction status of the payment transaction as the approved payment transaction. The payment gateway server sends a confirmation notification signal including the transaction status of the payment transaction as the approved payment transaction to the merchant server.

The merchant server is configured to complete the payment transaction failed due to the disconnection between the payment gateway server and the merchant server based on the confirmation notification signal received from the payment gateway server. The merchant server also removes (or discards) the unique ID once the payment transaction is recovered and successfully completed to avoid replay attacks.

In one embodiment, the issuer server generates a recovery code after sending the transaction status notification signal to the payment gateway server via the acquirer server. The recovery code is sent to the payment gateway server. The payment gateway server stores the recovery code against corresponding transaction information of the payment transaction. Further, the same recovery code is sent to the user device via a notification message signal along with the transaction status of the payment transaction by the issuer server. The user is enabled to enter the recovery code on a UI of the merchant application to initiate the transaction recovery request signal.

The merchant server sends the transaction recovery request signal including the recovery code to the payment gateway server. The payment gateway server electronically retrieves the corresponding transaction information stored against the recovery code that further includes the updated transaction status of the payment transaction. The payment gateway server identifies the transaction status of the payment transaction as the approved payment transaction. The payment gateway server sends a confirmation notification signal including the transaction status of the payment transaction as the approved payment transaction to the merchant server. The merchant server is configured to complete the payment transaction failed due to the disconnection between the payment gateway server and the merchant server based on the confirmation notification signal received from the payment gateway server. Various example embodiments of present disclosure are described hereinafter with reference to FIGS. 1 to 18.

FIG. 1 illustrates an exemplary representation of an environment 100 related to at least some example embodiments of the present disclosure.

In the illustrated environment 100, a user device 102 (e.g., a smartphone) of a user (not shown) is shown. Examples of the user device 102 include, but are not limited to, a personal computer (PC), a mobile phone, a tablet device, a Personal Digital Assistant (PDA), a voice activated assistant, a Virtual Reality (VR) device, and a laptop. A User Interface (UI) 106 is displayed by a payment gateway server 125 associated with an ABC payment gateway 104 on the user device 102. The UI 106 includes a message 108 displaying text, 'your payment transaction failed. Please try again later.'

In one embodiment, the message 108 is displayed by the payment gateway server 125 during a payment transaction initiated by the user using a merchant application (not shown in FIG. 1) installed on the user device 102. The merchant application is facilitated by a merchant server 120 on the user device 102 via a merchant interface. Examples of the merchant interface include a mobile application or a web application. The user completes the selection of the desired product or service from the merchant application and clicks on a 'checkout' tab on the checkout page of the merchant application. This results in the merchant server 120 contacting the payment gateway server 125 for processing the payment transaction. A UI (not shown) displayed by the payment gateway server 125 enables the user to select a payment method from one more payment method options such as 'cards' (e.g., debit cards, credit cards), 'banks' (e.g., net banking), 'wallets' (e.g., digital wallets) etc.

The user selects a preferred payment method (e.g., cards) for purchasing a product from the merchant application. The user is provided with the payment card by a card issuer such as an issuer bank. A corresponding issuer server 135 is associated with a financial institution normally called as an "issuer bank" or "issuing bank" or simply "issuer", in which the user may have an account, which issues a payment card, such as a credit card or a debit card. The UI also includes a transaction amount (e.g., 1000 INR) to be paid for the product to be purchased. Upon selection of the preferred payment method, the user clicks a button (not shown) labeled as 'Continue'.

The clicking of the button redirects the user to a UI (not shown) displayed by payment gateway server 125. The UI generally includes a message displaying text, 'your transaction is being processed, please do not press 'refresh' or 'back' button.' This is when the payment transaction is processed in back end by various entities as present on FIG. 1. The payment gateway server 125 sends a payment transaction request to an acquirer server 130. To accept payment, the merchant (not shown) must normally establish an account with a financial institution that is part of the financial payment system. This financial institution is usually called the "merchant bank" or the "acquiring bank" or "acquirer bank" or simply "acquirer". The acquirer server 130 is associated with the acquirer bank. The acquirer server 130 sends the payment transaction request to an interchange server i.e., a payment server 140 associated with a payment network 145. The payment network 145 may be used by the payment cards issuing authorities as a payment interchange network. One example of payment interchange network is Mastercard® payment system interchange network.

The user device 102, the merchant server 120, the issuer server 135, the acquirer server 130, the payment gateway server 125, and the payment server 140 communicate with one another using a communication network 150. The communication network 150 may be a centralized network or may comprise a plurality of sub-networks that may offer a direct communication or may offer indirect communication. Examples of the communication network 150 may include any type of wired network, wireless network, or a combination of wired and wireless networks. A wireless network may be a wireless local area network ("WLAN"), a wireless wide area network ("WWAN"), or any other type of wireless network now known or later developed. Additionally, the communication network 150 may be or include the Internet, intranets, extranets, microwave networks, satellite communications, cellular systems, personal communication services ("PCS"), infrared communications, global area networks, or other suitable networks, etc., or any combination of two or more such networks.

The payment network 145 may be used by the payment cards issuing authorities as a payment interchange network. Using the payment network 145, the computers of the acquirer bank/the acquirer server 130 or the merchant processor will communicate with the computers of the issuer/ the issuer server 135 to determine whether the customer's account is in good standing and whether the purchase is covered by the customer's available account balance. Based on these determinations, authorization of the payment transaction is declined/rejected or accepted/approved. When the payment transaction is authorized/approved, the available balance of the customer's account is decreased.

Response of an approved payment transaction is sent back to the payment gateway server 125 by the issuer server 135 which if received by the merchant server 120, results in completion of the payment transaction. However, in at least one embodiment, the payment gateway server 125 is unable to connect with the merchant server 120 for sending the response of approved payment transaction by the issuer server 135. In such scenarios, when the session times out, the message 108 is displayed by the payment gateway server 125 on the user device 102 about notifying that the payment transaction failed (due to a disconnection between the merchant server 120 and the payment gateway server 125).

In a non-limiting example, if the merchant is a non-PCI compliant merchant, he is unauthorized to process the payment transaction by himself. In such instances, a payment gateway (i.e., ABC payment gateway 104)/a Payment Service Provider (PSP) processes the payment transaction on behalf of the merchant. It should also be noted that a PCI compliant merchant can also opt for the services of a PSP/payment gateway to process the payment transactions. Accordingly, the ABC payment gateway 104 of the payment gateway server 125 needs to be registered with the payment network 145 to process the payment transaction. Further, if the merchant has not opted for the payment gateway services, the payment transaction request is initiated using the merchant application running on the user device 102 and directly sent to the acquirer server 130 which then processes the transaction further. In that scenario, the message 108 is displayed by the acquirer server 130 on the user device 102 for an approved payment transaction, yet, failed due to the disconnection between the acquirer server 130 and the merchant server 120.

Various embodiments of the present disclosure provide mechanisms such that the user and/or the merchant is enabled to recover the failed payment transaction that is already approved in the back end. In a non-limiting example, the process of recovering the payment transaction failed during the last leg of the payment transaction is facilitated by a combination of the merchant server 120, the payment gateway server 125, the acquirer server 130, the issuer server 135 and the payment server 140. The merchant server 120 is configured to generate a unique ID to be associated with the payment transaction that is later used for recovery of the transaction by sending to the payment gateway server 125 or the acquirer server 130, as the case may be, if the transaction gets failed. Normally, a charge is not posted immediately to a user's account because bankcard associations, such as Mastercard International Incorporated®, have promulgated rules that do not allow a merchant to charge, or "capture," a transaction until goods are shipped or services are delivered.

Therefore, when the transaction is recovered, the merchant ships or delivers the goods or services, and the merchant captures the transaction by, for example, appropriate data entry procedures on the merchant interface. If a user cancels a transaction before it is captured, a "void" is generated. If the user returns goods after the transaction has been captured, a "credit" is generated. After a transaction is captured, the transaction is settled among the merchant, the acquirer and the issuer. Settlement refers to the transfer of financial data or funds among the merchant's account, the acquirer, and the issuer, related to the transaction. Usually, transactions are captured and accumulated into a "batch", which is settled as a group. Thus, a merchant is enabled to complete a payment transaction only when the merchant is notified that the payment transaction that failed is actually approved.

In existing (conventional) payment transaction methods (i.e., not in accordance with the present disclosure), when a payment transaction fails due to a disconnection between the payment gateway server 125 and the merchant server 120, the user has to re-do the whole process starting from selecting the desired product on the merchant application. Also, release of the funds held for the failed transaction takes time at the issuer's end which further adds to the user's inconvenience in a way as the held funds cannot be used for other purchases. Alternatively, the user may be required to call the issuer for immediate release of the funds held for the failed transaction. In contrast to existing payment transaction methods, by using the embodiments of the present disclosure, the user is enabled to recover a payment transaction that is approved, yet, fails due to a broken communication link between the payment gateway server 125 and the merchant server 120 using a dedicated UI of the merchant application. The user is sparred from repeating the steps for initiating the payment transaction again, which further enhances the overall end-user experience. Some non-exhaustive example embodiments of recovering a failed payment transaction are described with reference to the following description, particularly with reference to FIGS. 2 to 18.

Figure 2:
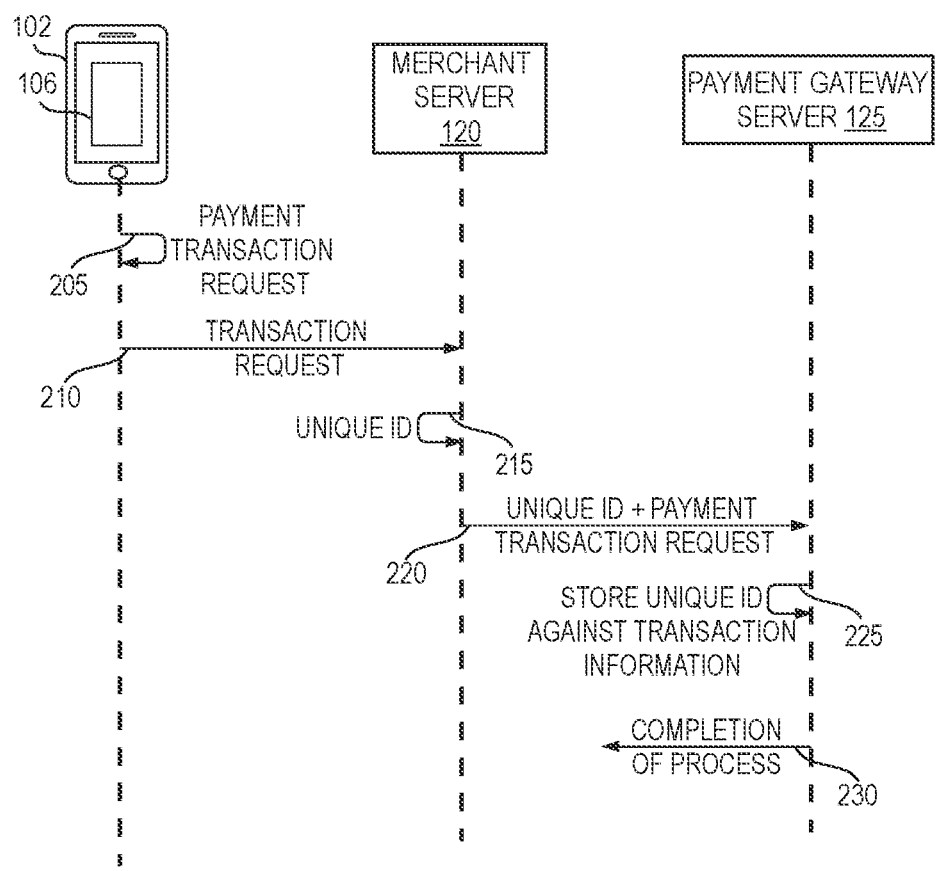
FIG. 2 is a sequence flow diagram representing generation of a unique ID to be associated with a payment transaction, in accordance with an example embodiment of the present disclosure.

FIG. 2 is a sequence flow diagram 200 representing generation of a unique ID to be associated with a payment transaction, in accordance with an example embodiment of the present disclosure.

At 205, a user upon accessing a merchant application 202 accessible on his user device (e.g., the user device 102) initiates a payment transaction request. As explained with reference to FIG. 1, when a user wants to purchase a product or a service from a merchant interface such as a merchant mobile application or a merchant website (hereinafter referred to as "merchant application 202"), the user selects the desired product or service displayed on the UI of the merchant application 202 and provides a command to checkout in order to pay for the selected product or service.

At 210, the user device 102 sends the payment transaction request to the merchant server 120. The payment transaction request includes the product or service name, a corresponding identifier code, a transaction amount, a transaction date, a transaction time, a merchant identifier, a merchant name, a merchant category code, a login ID of the user as associated with the merchant application and the like.

At 215, the merchant server 120 generates a unique Identifier (ID) to be associated with the payment transaction request of the payment transaction. In one embodiment, the unique ID is generated based on or more attributes described as below. Without loss of generality, an exemplary format of the unique ID may be a combination of attributes such as a Primary Account Number (PAN) of the user, the transaction date, the transaction time and the transaction amount. Another exemplary format of the unique ID is a combination of attributes such as a card number of the payment card used for processing the payment transaction, the transaction amount, the transaction data and the transaction time. This is helpful when the user is using multiple payment cards, as one unique ID is generated per user per transaction and it helps to find out which transaction to recover. Further, if the user has made multiple transactions on multiple cards then it becomes more difficult to trace the transaction. Therefore, having the card number as part of the unique ID helps in correct transaction recovery. Alternatively, additional attribute such as the login ID of merchant application may also be used as a unique ID associated with the payment transaction. The unique ID generated based on the first approach uniquely identifies which transaction to recover because of the details included therein the format itself. In alternate embodiments, the unique ID may also be generated using additional attributes such as session ID, IP address, device ID, User's personal ID, or a combination thereof. In some additional embodiments, the unique ID may also be generated based on a random number generator, and it can be a combination of characters, numbers or alpha-numeric characters At 220, the merchant server 120 sends the unique ID and the payment transaction request to the payment gateway server 125 for further processing of the payment transaction.

At 225, the payment gateway server 125 stores the unique ID against a transaction information in a database for later retrieval. The transaction information stored against the unique ID is explained later with reference to FIG. 3. The process of the generation of the unique ID to be associated with the payment transaction is completed at step 230. Further, a UI displayed by the payment gateway server 125 enables the user to select a preferred payment method such as 'cards', 'wallets', etc. In an example scenario, the user selects 'cards' as the preferred payment method. The user is asked to enter the corresponding card details (e.g., the payment card number, expiry date, CVV, cardholder name etc.) via the UI. The user is also asked to provide the PIN of the card for user authentication.

FIG. 3 is a schematic representation 300 of a unique ID stored against the transaction information in a database of a payment gateway server, in accordance with an example embodiment. A transaction information 306 is shown to include a plurality of information represented via a corresponding plurality of columns such as a transaction amount 302a, a payment method information 302b, a transaction status 302c and a login ID 302d of the user as associated with the merchant application 202. A row 302 is shown to include a unique ID 308 stored against the corresponding columns 302a to 302d under the transaction information 306. An exemplary information relevant to the payment transaction as explained with reference to FIG. 1 and FIG. 2 is shown in a row 304. The row 304 includes a unique ID '123456xyz' (see, 310) stored against the transaction information 306 including columns respectively, as the transaction amount being 1000 INR (see, 304a), the payment method information being card number ending with xxxx xxxx xxxx 3728 (see, 304b), the transaction status represented as '-' (i.e., yet not known) (see, 304c) and the login ID being xyz@ecommerce.in (see, 304d) of the user. In one embodiment, the unique ID 310 is stored in the database for a pre-determined period of time (e.g., 24 hours) so as to allow the user to recover a failed transaction during that time-period.

Figure 4:
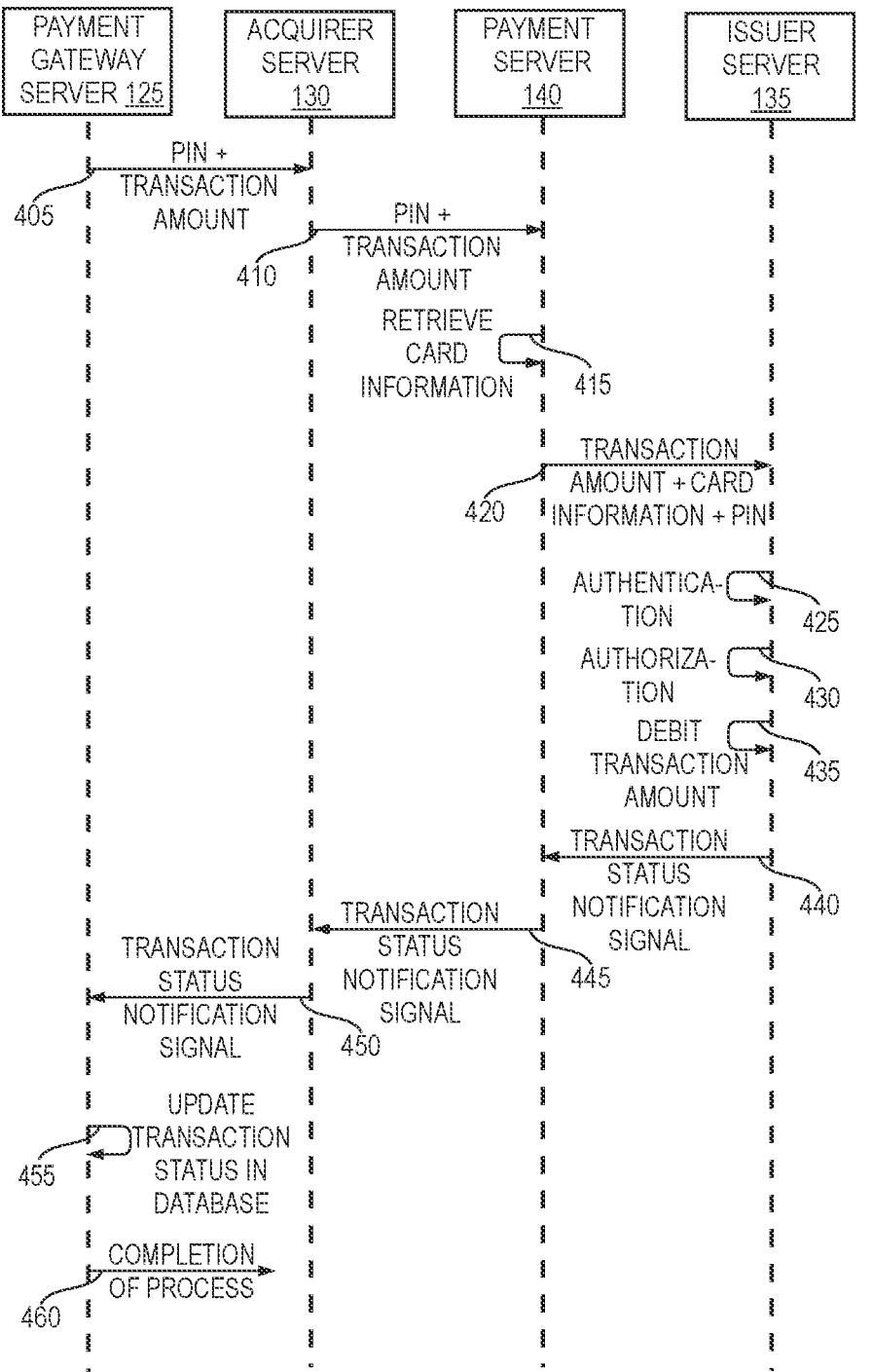
FIG. 4 is a sequence flow diagram representing a payment transaction being approved by an issuer server, in accordance with an example embodiment.

FIG. 4 is a sequence flow diagram 400 representing a payment transaction being approved by an issuer server, in accordance with an example embodiment. As explained with reference to FIG. 2, the user provides a PIN for a selected payment card to process the payment transaction using the UI displayed by the payment gateway server 125.

At 405, the payment gateway server 125 sends the PIN and the transaction amount to the acquirer server 130. The transaction amount is a part of the transaction information stored against the unique ID in the database of the payment gateway server 125 as explained with reference to FIG. 3.

At 410, the acquirer server 130 sends the PIN and the transaction amount to the payment server 140 for verification. The acquirer server 130 also determines the acquirer account of the merchant and sends the acquirer account details to the payment server 140. The payment server 140 identifies the merchant using the acquirer details received from the acquirer server 130 for facilitating completion of the payment transaction.

At 415, the payment server 140 retrieves the card information of the payment card from the database. At 420, the retrieved card information, the PIN and the transaction amount are sent to the issuer server 135 for authorization.

At 425, the issuer server 135 performs authentication of the user by verifying the PIN. Alternatively, the payment server 140 verifies the PIN by mapping the PIN to its associated cardholder PAN (i.e., PAN of the user) stored in a database.

At 430, the issuer server 135 performs authorization of the payment card and transaction amount by verifying the card information of the payment card, available balance amount in the cardholder account against the received transaction amount, issuer account information and the like. Some non-exhaustive examples of the issuer account information include Bank Identifier Code (BIC), account number, payment card number and the like.

At 435, the issuer server 135 debits the transaction amount from the user's account. At 440, the issuer server 135 sends a transaction status notification signal of debiting of the transaction amount to the payment server 140 via the payment network 145. Further, the transaction status notification signal includes the transaction status of the payment transaction as the approved payment transaction.

At 445, the payment server 140 forwards the transaction status notification signal to the acquirer server 130. At 450, the acquirer server 130 sends the transaction status notification signal to the payment gateway server 125.

At 455, the payment gateway server 125 updates the transaction status entry in its database. The transaction status is entered as 'approved' and stored against the unique ID. The process of the payment transaction being approved by the issuer server 135 completes at operation 460.

FIG. 5 is a schematic representation 500 of a unique ID stored against an updated transaction information in a database of a payment gateway server, in accordance with an example embodiment. The exemplary information relevant to the payment transaction as explained with reference to FIG. 1 and FIG. 2 is shown in a row 502. The row 502 includes same information as the row 304 of FIG. 3 except for the transaction status updated based on the payment transaction being approved by the issuer server 135 as explained with reference to FIG. 4. The row 502 includes the unique ID '123456xyz' (see, 310) stored against the transaction information 306 including the columns respectively, as the transaction amount being 1000 INR (see, 304*a*), the payment method information being card number ending with xxxx xxxx xxxx 3728 (see, 304*b*), the transaction status represented as 'approved' (see, 502*a*) and the login ID being xyz@ecommerce.in (see, 304*d*) of the user.

During a successfully completed payment transaction, after updating the transaction status entry in its database (i.e., step 450 of FIG. 4), the payment gateway server 125 sends the transaction status to the merchant server 120. Further, the acquirer server 130 credits the transaction amount in the merchant account. The payment gateway server 125 sends the transaction status to the user device 102 of the user. Alternatively, the transaction status may be sent by the merchant application 202 to the user device 102. The merchant dispatches the product purchased by the user for delivery and the payment transaction process completes successfully. However, there are scenarios, when the payment gateway server 125 is unable to connect to the merchant server 120 for updating the transaction status of the payment transaction for completion of the payment transaction.

Figure 6:
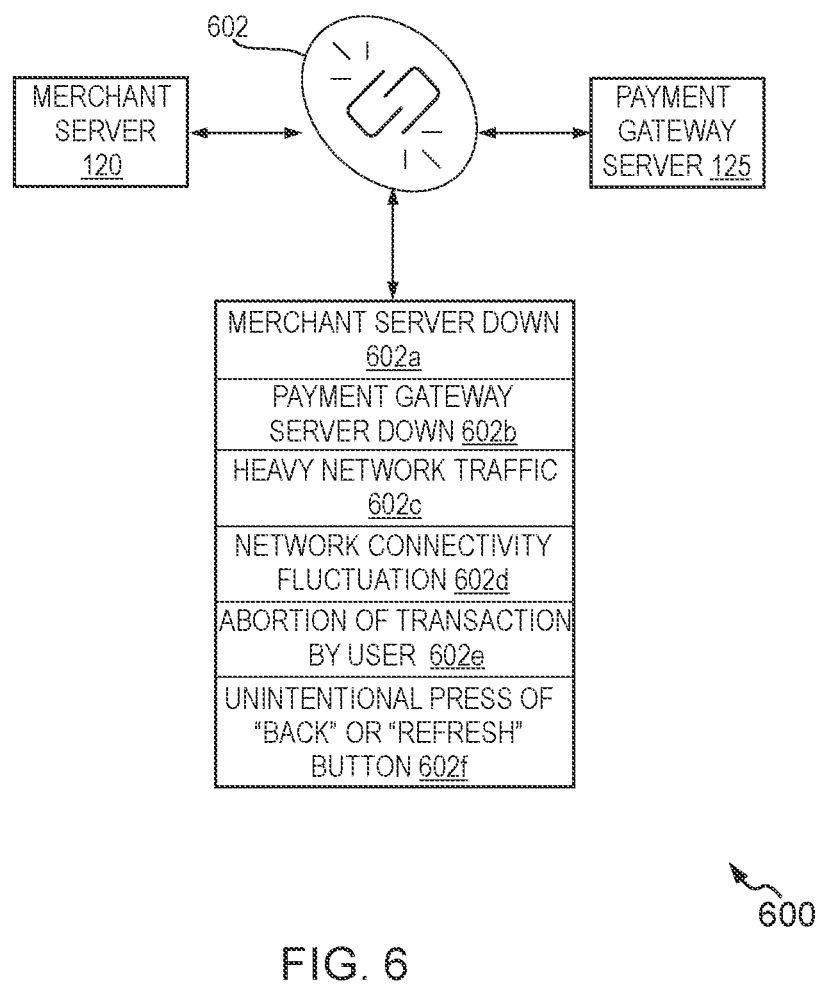
FIG. 6 is a schematic representation of a disconnection between a merchant server and the payment gateway server, in accordance with an example embodiment.

FIG. 6 is a schematic representation 600 of a disconnection between a merchant server and a payment gateway server, in accordance with an example embodiment. The representation 600 includes the merchant server 120 and the payment gateway server 125 with a disconnected link 602/a broken communication link 602 between both the servers. The representation 600 also includes some non-exhaustive examples of reasons of the broken communication link 602 (hereinafter alternatively referred to as "link 602"). For example, the link 602 gets broken if the merchant server 120 is down (see, 602*a*). The merchant server 120 may be temporarily down due to a technical fault. The link 602 gets broken if the payment gateway server 125 is down (see, 602*b*). The link 602 gets broken if there is a very heavy network traffic (see, 602*c*) faced by both the servers and hence they are unable to communicate with each other. The link 602 gets broken if there is a network connectivity fluctuation (see, 602*d*). The link 602 also gets broken if the user aborts the payment transaction (see, 602*e*) by closing the browser window while waiting for the payment to be processed. Further, the link 602 gets broken if the user by mistake/unintentionally presses the "back" or the "refresh" button (see, 602*f*) on the browser window while waiting for the payment to be processed. Thus, there are many possibilities when a payment transaction is processed successfully in the back end, however, is not notified to the merchant server 120 and fails only for that reason. Various embodiments of the present disclosure enable the user to recover a payment transaction failed due to the disconnected link 602 between the payment gateway server 125 and the merchant server 120.

Figure 7:
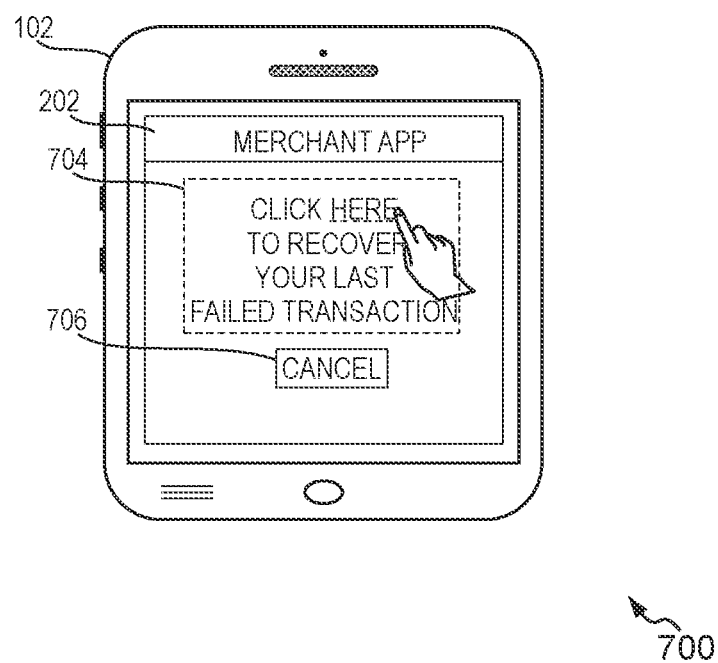
FIG. 7 represents an example User Interface (UI) of a merchant application configured to electronically facilitate initiation of a transaction recovery request signal, in accordance with an example embodiment of the present disclosure.

FIG. 7 represents an example UI 700 of a merchant application configured to electronically facilitate initiation of a transaction recovery request signal, in accordance with an example embodiment of the present disclosure. The UI 700 of the merchant application 202 is displayed on the user device 102 as shown. After receiving a failure notification (e.g., message 108 of FIG. 1) displayed on the UI (e.g., UI 106 of FIG. 1) facilitated by the payment gateway server 125, the user goes to the UI 700 of the merchant application 202 to initiate recovery of the failed payment transaction. The UI 700 includes a clickable information field 704 displaying text, 'click here to recover your last failed transaction'. The user clicks on the clickable link (i.e., 'here'), to submit selection of the recovery of the transaction. If the user does not wish to recover the transaction, he may click a button 706 labeled, 'cancel' for closing the UI 700. Clicking of the hyperlink 'here' results in initiation of the transaction recovery request. A corresponding transaction recovery request signal is sent by the merchant application 202 to the merchant server 120 for processing the recovery request further.

In one embodiment, the UI 700 also includes a form field (not shown) that enables the user to enter the unique ID therein for searching a failed transaction using the unique ID. When the corresponding failed transaction as associated with the unique ID is displayed by the merchant application 202 on the UI 700, the user clicks a 'submit' button (not shown) to initiate the transaction recovery request. This results in sending of a corresponding transaction recovery request signal by the merchant application 202 to the merchant server 120 for processing the recovery request further. In such a scenario, the unique ID is shared with the user in advance by way of a notification message upon being generated by the merchant server 120. Thus, a unique ID being unique per transaction per user, allows the user to search all corresponding failed transactions using an applicable unique ID. In an example embodiment, the user may be enabled to search a failed transaction using the unique ID on a UI such as the UI 106 facilitated by the payment gateway server 125 for initiating the transaction recovery process.

In an example scenario, when the user receives the message 108 from the payment gateway server 125 about failure of the payment transaction, the user may immediately restart the transaction by himself without the knowledge that a unique ID is generated in the back end and the transaction was successfully approved. Also, there may be cases where the message 108 is not received by the user or he misses to read the message 108. In all such scenarios, when the user reinitiates the failed transaction, the payment gateway server 125 or the merchant server 120 receives the payment transaction request for the second time (as earlier explained with reference to FIG. 2). At this point of time, the merchant server 120 sends the unique ID to the user by a notification message e.g., an SMS. Alternatively, the merchant server 120 may prompt a pop-up message on the user device 102 during the repeated transaction that displays the unique ID previously generated by the merchant server 120 at the time of the failure of the first payment transaction. The user is further requested to enter this unique ID received within a predetermined time-period (e.g., 15 minutes) on a corresponding UI facilitated by the merchant server 120 or the payment gateway server 125 in order to recover the previously failed transaction and abort the processing of the second/repeated payment transaction initiated by the user. The unique ID entered by the user during processing of the second payment transaction is received by the merchant server 120 and payment gateway server 125 and is verified against the previously stored unique ID. Upon a successful match, the user is notified of the transaction status of the previously failed transaction (as approved) and the second payment transaction is not processed further. This aspect of the present disclosure helps the user to save time and efforts from repeating the payment transaction process and also from the transaction amount being debited from the user account for the second time.

Figure 8:
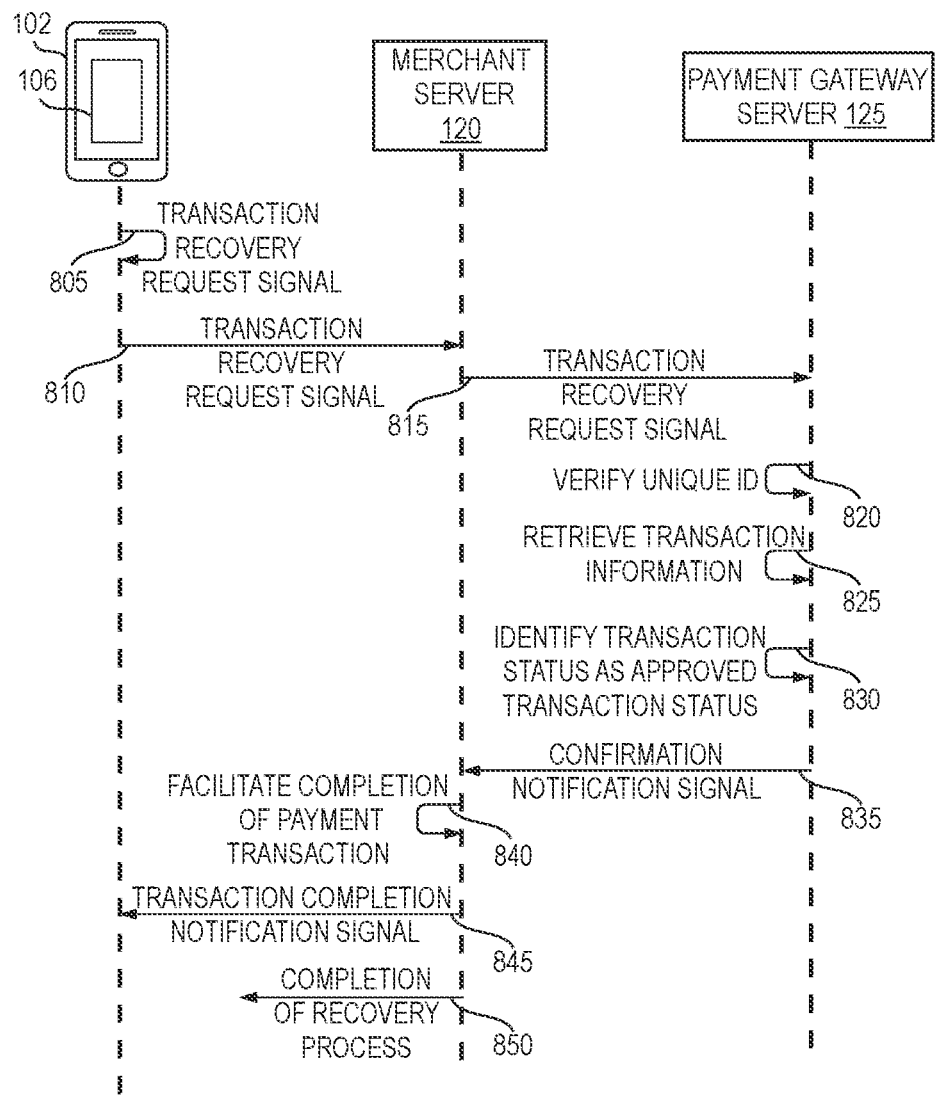
FIG. 8 is a sequence flow diagram representing a recovery of a failed payment transaction, in accordance with an example embodiment.

FIG. 8 is a sequence flow diagram 800 representing a recovery of a failed payment transaction, in accordance with an example embodiment. The sequence of operations of the flow diagram 800 may not be necessarily executed in the same order as they are presented. Further, one or more operations may be grouped together and performed in form of a single step, or one operation may have several sub-steps that may be performed in parallel or in sequential manner.

At 805, a user provides a user input on a UI (e.g., the UI 700) of the merchant application 202 running on the user device 102 to initiate a transaction recovery request signal. At 810, the user device 102 sends the transaction recovery request signal to the merchant server 120 via the merchant application 202. In one embodiment, if the transaction recovery request signal is received from different browsers (or different IP addresses) at the same time, in order to ensure the security of the transaction, the transaction recovery request is kept on hold/canceled. When the transaction recovery request is kept on hold, such different browser requests are first scrutinized and then only processed further. At 815, the merchant server 120 sends the transaction recovery request signal to the payment gateway server 125. The merchant server 120 also adds the unique ID previously generated for associating with the payment transaction in the transaction recovery request signal.

At 820, the payment gateway server 125 verifies the unique ID received from the merchant server 120 as part of the transaction recovery request signal. The unique ID is verified against the stored unique ID present in the database of the payment gateway server 125. The unique ID is received by the payment gateway server 125 in advance from the merchant server 120 along with the transaction amount at a time of processing the payment transaction as explained earlier with reference to FIG. 3 and FIG. 5.

Upon successful verification, at 825, the payment gateway server 125 retrieves the transaction information stored against the unique ID from the database. The transaction information includes, for example, the transaction amount, the transaction payment method information, the transaction status, and the login ID associated with a user of the merchant application, the merchant identifier, the transaction identifier and the like.

At 830, the payment gateway server 125 identifies the transaction status of the payment transaction as an 'approved' payment transaction. As explained with reference to FIG. 4, the payment transaction is approved based on performing by the issuer server 135, each of a successful authentication of a user, a successful authorization of a user account, and a debiting of the transaction amount from the user account. The issuer server 135 also sends the transaction status notification signal including the transaction status of the payment transaction as the approved payment transaction. The transaction status is updated against the unique ID stored in the database of the payment gateway server 125 as explained with reference to FIG. 5.

At 835, the payment gateway server 125 sends a confirmation notification signal to the merchant server 120. The confirmation notification signal includes the transaction status of the payment transaction as the approved payment transaction.

At 840, the merchant server 120 facilitates completion of the payment transaction. The merchant initiates dispatch of the product and captures the transaction by, for example, appropriate data entry procedures on the merchant interface. After a transaction is captured, the transaction is settled among the merchant, the acquirer and the issuer by transfer of funds among the merchant's account, the acquirer, and the issuer. Thus, a merchant is enabled to complete a payment transaction only when the merchant is notified that the payment transaction that failed is actually approved.

At 845, the merchant server 120 sends a transaction completion notification signal to the user device 102 via the merchant application 202. The recovery of a failed payment transaction due to the disconnection between the merchant server 120 and the payment gateway server 125 completes at step 850.

Figure 9:
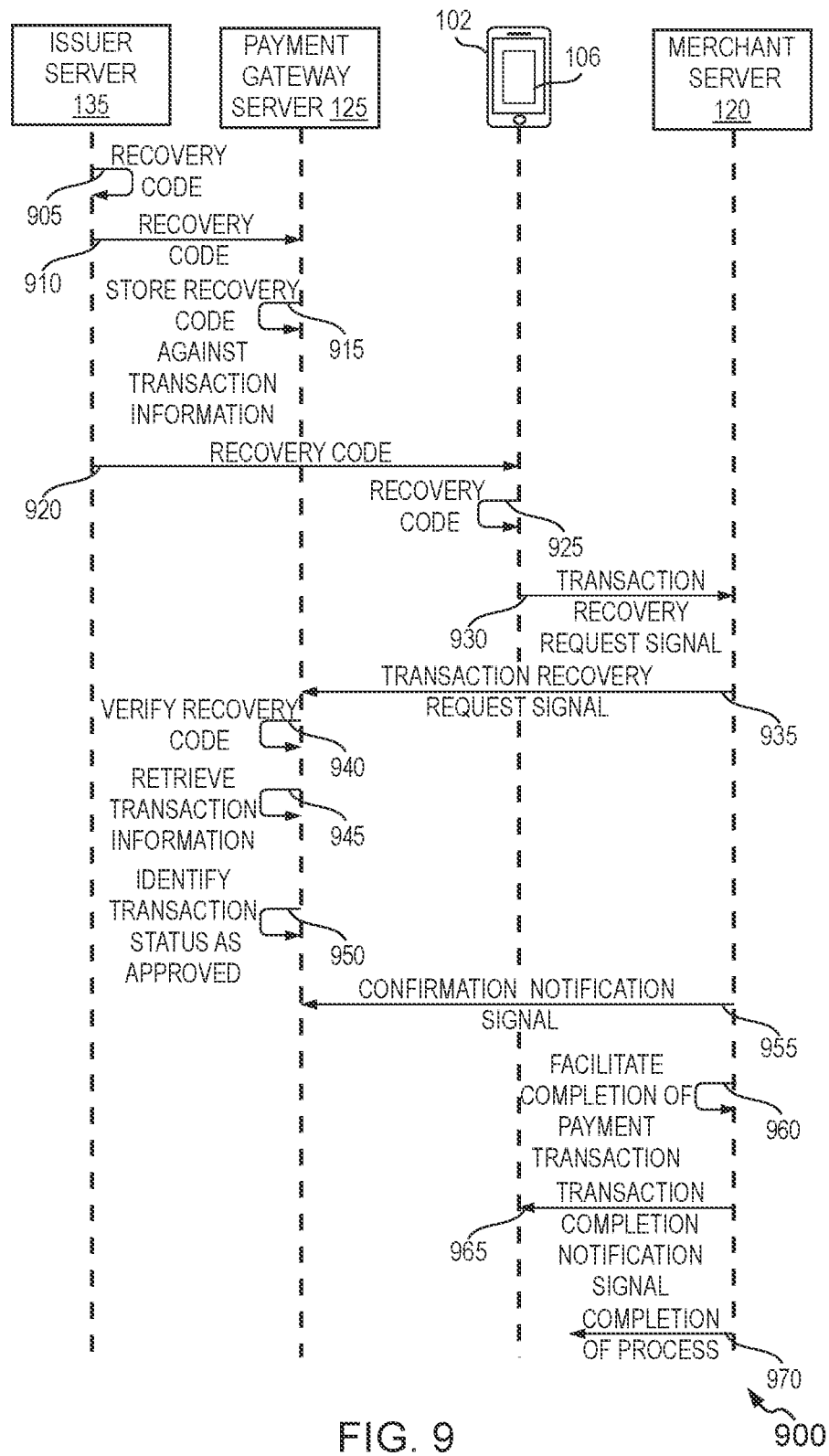
FIG. 9 is a sequence flow diagram representing a recovery of a failed payment transaction, in accordance with another example embodiment.

FIG. 9 is a sequence flow diagram 900 representing a recovery of a failed payment transaction, in accordance with another example embodiment. The sequence of operations of the flow diagram 900 may not be necessarily executed in the same order as they are presented. Further, one or more operations may be grouped together and performed in form of a single step, or one operation may have several sub-steps that may be performed in parallel or in sequential manner. As explained with reference to FIG. 4, after successful authentication and authorization of the payment transaction, the issuer server 135 debits the transaction amount from the user account and sends a transaction status notification signal of approving the payment transaction to the payment gateway server 125 via the payment server 140 and the acquirer server 130.

Upon sending the transaction status notification signal, at 905, the issuer server 135 generates a recovery code. The recovery code may be same as the unique ID explained hereinabove with reference to the foregoing figures. The recovery code may be a different number or a combinational code that is different from the unique ID.

At 910, the issuer server 135 sends the recovery code to the payment gateway server 125.

At 915, the payment gateway server 125 stores the recovery code against the transaction information in the database. As explained with reference to FIG. 5, instead of the unique ID, the recovery code is stored against the transaction information for later retrieval. The transaction status is also updated to 'approved' in the database. In at least one embodiment, as explained with reference to FIG. 6, the payment gateway server 125 is unable to communicate with the merchant server 120 about the approved transaction status for successful completion of the payment transaction and therefore, the payment transaction fails. The user is also notified about the failure of the payment transaction by the payment gateway server 125 using a corresponding UI.

At 920, the issuer server 135 sends the recovery code to the user device 102 via a notification message signal along with the transaction status of the payment transaction. As the user reads the notification message that includes the recovery code, the user visits the merchant application 202 running on the user device 102 to initiate recovery of the failed transaction. In at least one embodiment, the merchant server 120 is capable of providing a UI (not shown) of the merchant application 202 that enables the user to enter the recovery code received from the issuer server 135 via the notification message.

At 925, the user enters the recovery code on the UI of the merchant application 202 running on the user device 102. This results in initiation of the transaction recovery request signal.

At 930, the user device 102 sends the transaction recovery request signal to the merchant server 120 via the merchant application 202.

At 935, the merchant server 120 sends the transaction recovery request signal to the payment gateway server 125. The merchant server 120 also adds the recovery code entered by the user on the UI of the merchant application 202 in the transaction recovery request signal.

At 940, the payment gateway server 125 verifies the recovery code received from the merchant server 120 as part of the transaction recovery request signal. The recovery code is verified against the stored recovery code present in the database of the payment gateway server 125. The recovery code is received by the payment gateway server 125 in advance from the issuer server 135.

Upon successful verification, at 945, the payment gateway server 125 retrieves the transaction information stored against the recovery code from the database.

At 950, the payment gateway server 125 identifies the transaction status of the payment transaction as an 'approved' payment transaction. At 955, the payment gateway server 125 sends a confirmation notification signal to the merchant server 120. The confirmation notification signal includes the transaction status of the payment transaction as the approved payment transaction.

At 960, the merchant server 120 facilitates completion of the payment transaction as explained with reference to FIG. 8 hereinabove.

At 965, the merchant server 120 sends a transaction completion notification signal to the user device 102 via the merchant application 202. The recovery of a failed payment transaction due to the disconnection between the merchant server 120 and the payment gateway server 125 completes at step 970.

In one embodiment, if the merchant has not opted for the payment gateway services from a payment gateway, the payment transaction request initiated using the merchant application 202 running on the user device 102 is directly sent to the acquirer server 130 which then processes the transaction further. Accordingly, FIG. 10 and FIG. 11 represent recovery of a payment transaction that is approved and failed due to the disconnection between the merchant server 120 and the acquirer server 130.

Figure 10B:
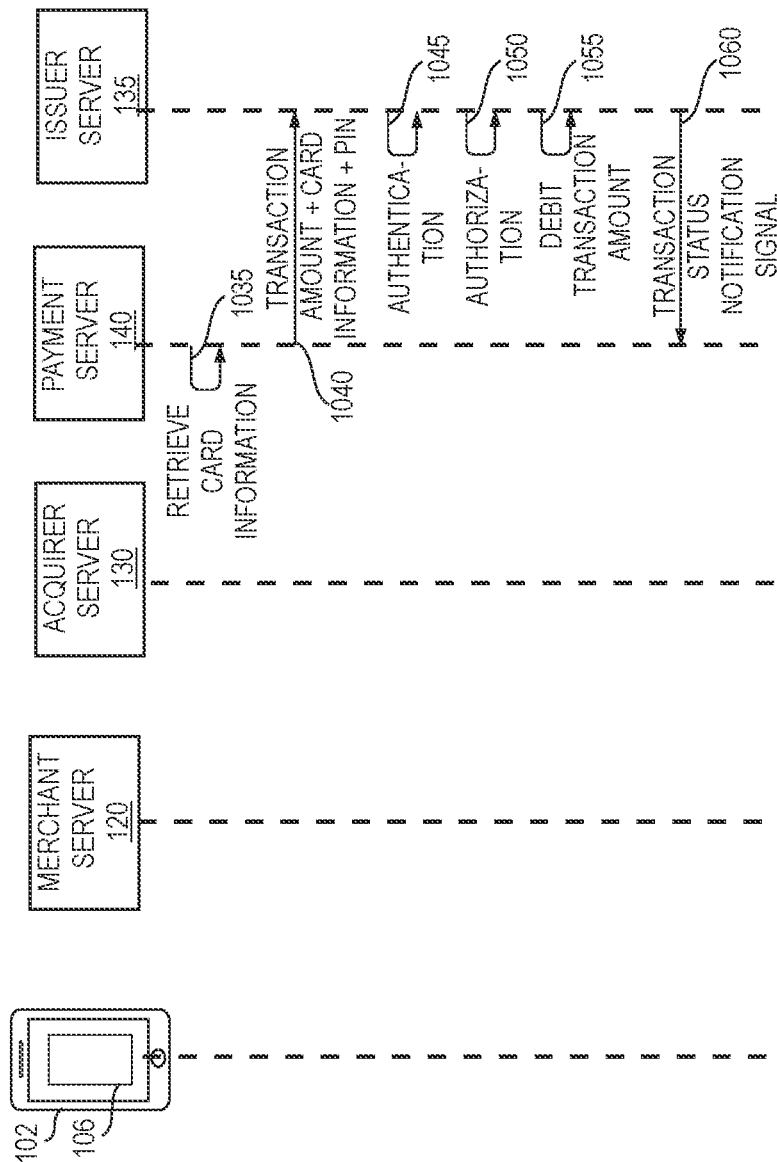
Figure 11:
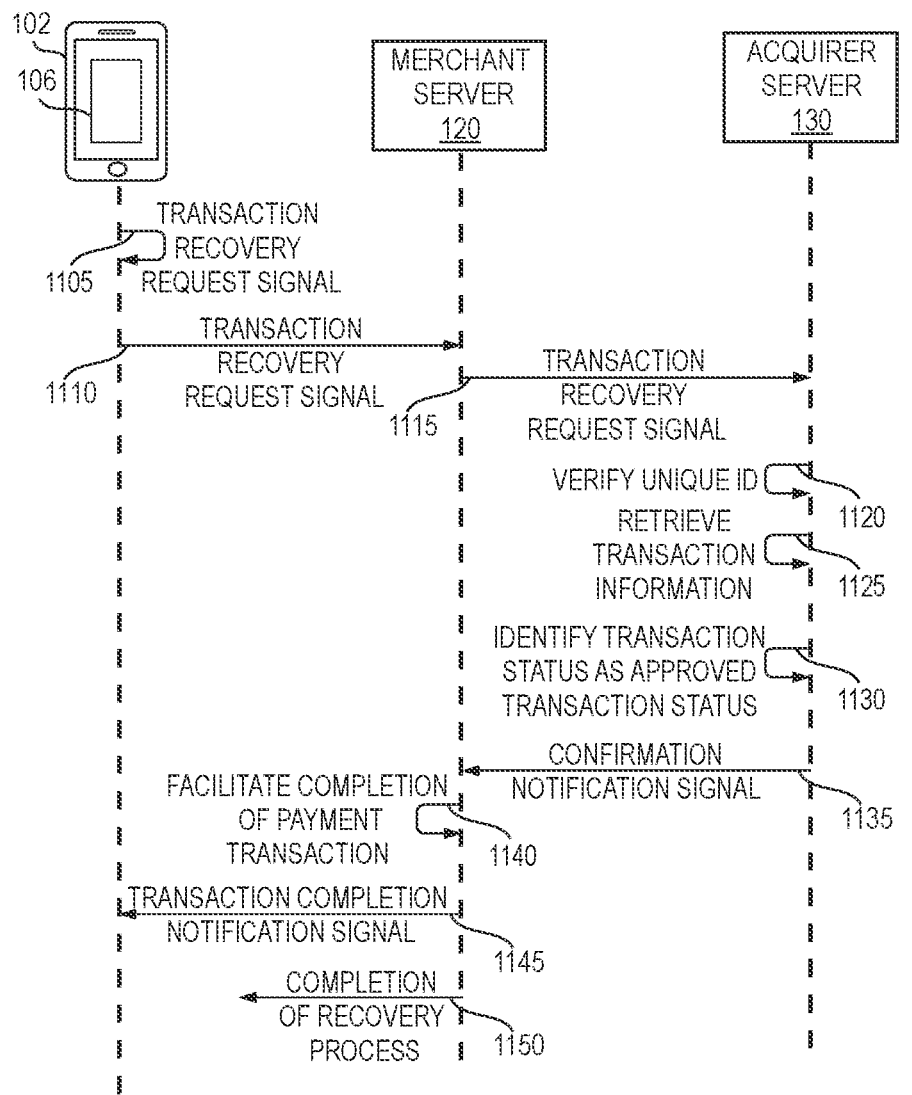
FIG. 11 is a sequence flow diagram representing a recovery of a failed payment transaction, in accordance with another example embodiment.

FIG. 10 is a sequence flow diagram 1000 representing updating of a transaction status by an acquirer server against a unique ID received from a merchant server for a payment transaction, in accordance with an example embodiment. The sequence of operations of the flow diagram 1000 may not be necessarily executed in the same order as they are presented. Further, one or more operations may be grouped together and performed in form of a single step, or one operation may have several sub-steps that may be performed in parallel or in sequential manner.

At 1005, a user upon accessing the merchant application 202 accessible on his user device (e.g., a user device 102) initiates a payment transaction request. When a user wants to purchase a product or a service from the merchant application 202, the user selects the desired product or service displayed on the UI of the merchant application 202 and provides a command to checkout in order to pay for the selected product or service. Another UI (not shown) displayed by the merchant application 202 enables the user to select a payment method from one more payment method options such as 'cards' (e.g., debit cards, credit cards), 'banks' (e.g., net banking), 'wallets' (e.g., digital wallets) and the like. The user selects a preferred payment method (e.g., cards). The user is asked to enter the corresponding card details (e.g., the payment card number, expiry date, CVV, cardholder name etc.) via the UI. The user is also asked to provide the PIN of the card for user authentication. The UI also includes a transaction amount (e.g., 1000 INR) to be paid for the product or service to be purchased. Upon selection of the preferred payment method, the user clicks a button (not shown) displayed on the UI and labeled as 'Continue' to generate the payment transaction request. The payment transaction request includes the product or service name, a corresponding identifier code, a transaction amount, a transaction date, a transaction time, a merchant identifier, a merchant name, a merchant category code, a login ID of the user as associated with the merchant application, selected payment method information and the like.

At 1010, the user device 102 sends the payment transaction request to the merchant server 120.

At 1015, the merchant server 120 generates a unique Identifier (ID) to be associated with the payment transaction request of the payment transaction. as explained with reference to FIG. 2, an exemplary format of the unique ID is a combination of a PAN of the user, the transaction date, the transaction time and the transaction amount.

At 1020, the merchant server 120 sends the unique ID and the payment transaction request to the acquirer server 130 for further processing of the payment transaction.

At 1025, the acquirer server 130 stores the unique ID against a transaction information in a database for later retrieval. The transaction information is stored against the unique ID in a database of the acquirer server 130 similar to as explained earlier with reference to FIG. 3 for the payment gateway server 125.

At 1030, the acquirer server 130 sends the PIN and the transaction amount to the payment server 140 for verification. The acquirer server 130 also determines the acquirer account of the merchant and sends the acquirer account details to the payment server 140. The payment server 140 identifies the merchant using the acquirer details received from the acquirer server 130 for facilitating completion of the payment transaction.

At 1035, the payment server 140 retrieves the card information of the payment card from the database. At 1040, the retrieved card information, the PIN and the transaction amount are sent to the issuer server 135 for authorization.

At 1045, the issuer server 135 performs authentication of the user by verifying the PIN. Alternatively, the payment server 140 verifies the PIN by mapping the PIN to its associated cardholder PAN (i.e., PAN of the user) stored in a database.

At 1050, the issuer server 135 performs authorization of the payment card and transaction amount by verifying the card information of the payment card, available balance amount in the cardholder account against the received transaction amount, issuer account information and the like.

At 1055, the issuer server 135 debits the transaction amount from the user's account. At 1060, the issuer server 135 sends a transaction status notification signal of debiting of the transaction amount to the payment server 140 via the payment network 145. Further, the transaction status notification signal includes the transaction status of the payment transaction as the approved payment transaction.

At 1065, the payment server 140 forwards the transaction status notification signal to the acquirer server 130.

At 1070, the acquirer server 130 updates the transaction status entry in its database. The transaction status is entered as 'approved' and stored against the unique ID. The process of updating the transaction status of the payment transaction being approved by the issuer server 135 in a database of the acquirer server 130 completes at operation 1075. In an example embodiment, when the communication link between the merchant server 120 and the acquirer server 130 breaks due to one of the reasons enlisted with reference to FIG. 6, the payment transaction, even if, approved, fails and the user is notified by a message (e.g. the message 108 of FIG. 1) using a UI displayed by the acquirer server 130 or the payment server 140 about the failure of the payment transaction.

FIG. 11 is a sequence flow diagram 1100 representing a recovery of a failed payment transaction, in accordance with another example embodiment. The sequence of operations of the flow diagram 1100 may not be necessarily executed in the same order as they are presented. Further, one or more operations may be grouped together and performed in form of a single step, or one operation may have several sub-steps that may be performed in parallel or in sequential manner.

At 1105, a user provides a user input on a UI (e.g., the UI 700) of the merchant application 202 running on the user device 102 to initiate a transaction recovery request signal. At 1110, the user device 102 sends the transaction recovery request signal to the merchant server 120 via the merchant application 202.

At 1115, the merchant server 120 sends the transaction recovery request signal to the acquirer server 130. The merchant server 120 also adds the unique ID previously generated for associating with the payment transaction in the transaction recovery request signal.

At 1120, the acquirer server 130 verifies the unique ID received from the merchant server 120 as part of the transaction recovery request signal. The unique ID is verified against the stored unique ID present in the database of the acquirer server 130. The unique ID is received by the acquirer server 130 in advance from the merchant server 120 along with the transaction amount at a time of processing the payment transaction as explained with reference to FIG. 10.

Upon successful verification, at 1125, the acquirer server 130 retrieves the transaction information stored against the unique ID from the database. At 1130, the acquirer server 130 identifies the transaction status of the payment transaction as an 'approved' payment transaction.

At 1135, the acquirer server 130 sends a confirmation notification signal to the merchant server 120. The confirmation notification signal includes the transaction status of the payment transaction as the approved payment transaction.

At 1140, the merchant server 120 facilitates completion of the payment transaction as explained with reference to FIG. 8.

At 1145, the merchant server 120 sends a transaction completion notification signal to the user device 102 via the merchant application 202. The recovery of a failed payment transaction due to the disconnection between the merchant server 120 and the acquirer server 130 completes at step 1150.

In one example embodiment, if the link between the merchant server 120 and the acquirer server 130 is still broken at the time of sending the transaction recovery request signal to the acquirer server, instead the merchant server 120 sends the transaction recovery request signal to the issuer server 135 or the payment server 140. The issuer server 135 or the payment server 140 reverts with the transaction status of the payment transaction and the payment transaction is recovered successfully. To achieve this, the unique ID generated at the time of payment transaction request is forwarded by the acquirer server 130 to the issuer server 135 and the payment server 140 along with the PIN, the transaction amount, the card information etc. for later retrieval of the unique ID. Similarly, in another example embodiment, if the link between the merchant server 120 and the payment gateway server 125 is still broken, the merchant server sends the transaction recovery request signal to the acquirer server 130, the issuer server 135 or the payment server 140 for recovery of the failed payment transaction.

Figure 12:
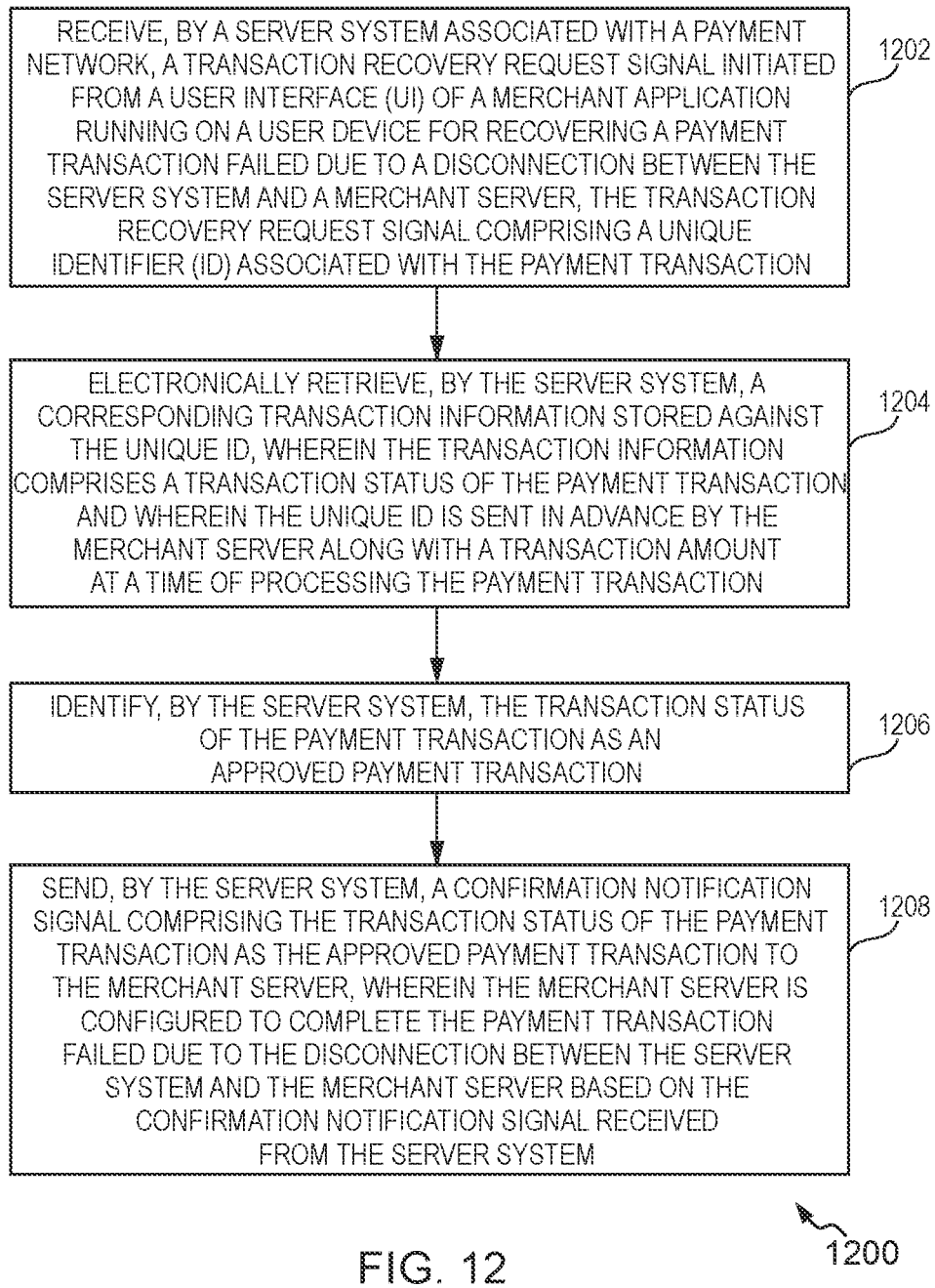
FIG. 12 illustrates a flow diagram of a method for recovering a failed payment transaction, in accordance with an example embodiment.

FIG. 12 illustrates a flow diagram of a method 1200 for recovering a failed payment transaction, in accordance with an example embodiment. more specifically, the method 1200 for recovering a payment transaction that is approved, however, failed due to a disconnection between a server system and a merchant server is explained. The method 1200 depicted in the flow diagram may be executed by, for example, the at least one server system such as the payment gateway server 125, the acquirer server 130, the issuer server 135 and the payment server 140. The operations of the method 1200, and combinations of operation in the method 1200, may be implemented by, for example, hardware, firmware, a processor, circuitry and/or a different device associated with the execution of software that includes one or more computer program instructions. The method 1200 starts at operation 1202.

At 1202, the method includes receiving, by a server system associated with a payment network, a transaction recovery request signal initiated from a UI of a merchant application running on a user device for recovering a payment transaction failed due to a disconnection between the server system and a merchant server. The transaction recovery request signal includes a unique Identifier (ID) associated with the payment transaction. For example, the merchant server is out of sync with the server system and the merchant server does not know whether the payment transaction is approved.

At 1204, the method includes electronically retrieving, by the server system, a corresponding transaction information stored against the unique ID. The transaction information includes a transaction status of the payment transaction and the unique ID is sent in advance by the merchant server along with a transaction amount at a time of processing the payment transaction.

At 1206, the method includes identifying, by the server system, the transaction status of the payment transaction as an approved payment transaction.

At 1208, the method includes sending, by the server system, a confirmation notification signal including the transaction status of the payment transaction as the approved payment transaction to the merchant server. The merchant server is configured to complete the payment transaction failed due to the disconnection between the server system and the merchant server based on the confirmation notification signal received from the server system. The method 1200 ends at operation 1208.

Figure 13:
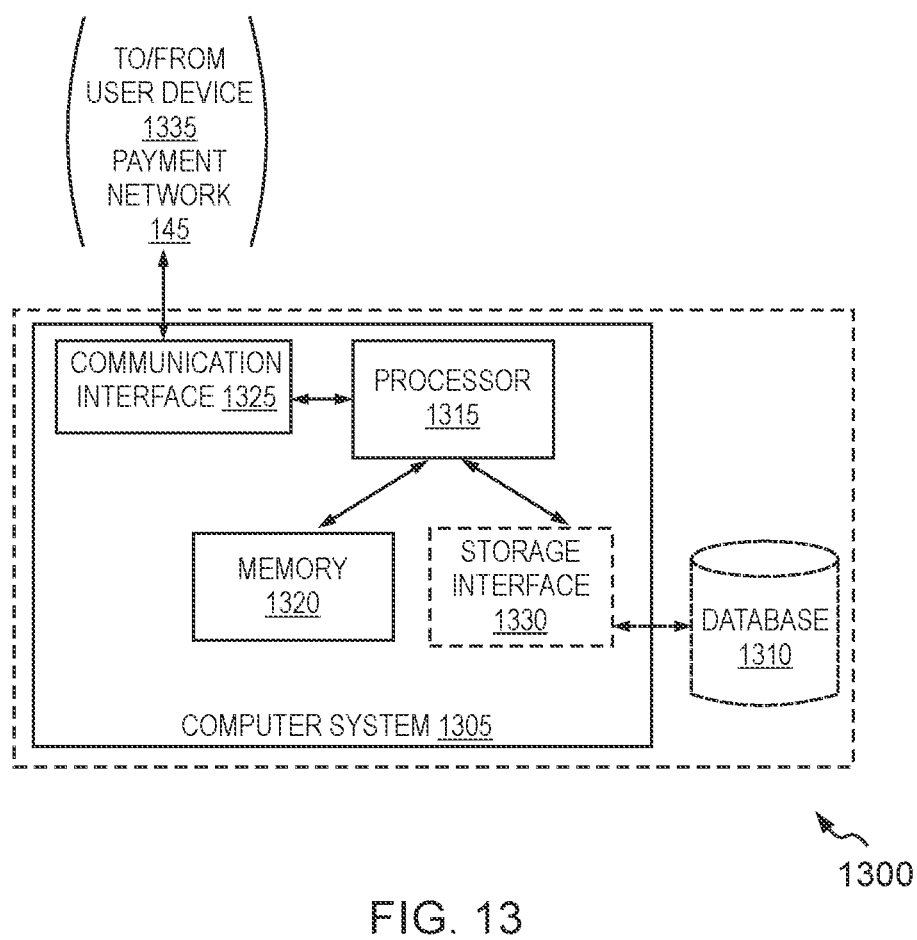
FIG. 13 is a simplified block diagram of a server system, in accordance with one embodiment of the present disclosure.

FIG. 13 is a simplified block diagram of a server system 1300, in accordance with one embodiment of the present disclosure. The server system 1300 is an example of a server system that includes the payment gateway server 125, the merchant server 120, the issuer server 135, and the acquirer server 130 communicatively connected to the payment server 140 of FIG. 1. The server system 1300 includes a computer system 1305, and a database 1310. The computer system 1305 includes a processor 1315 for executing instructions. Instructions may be stored in, for example, but not limited to, a memory 1320. The processor 1315 may include one or more processing units (e.g., in a multi-core configuration). The processor 1315 is operatively coupled to a communication interface 1325 such that the computer system 1305 can communicate with a remote device such as a user device 1335 (e.g., the user device 102) or any entity within the payment network 145. For example, the communication interface 1325 may receive a payment transaction request, a transaction recovery request signal and the like from the user device 1335.

The processor 1315 may also be operatively coupled to the database 1310. The database 1310 is any computer-operated hardware suitable for storing and/or retrieving data. The database 1310 may include multiple storage units such as hard disks and/or solid-state disks in a redundant array of inexpensive disks (RAID) configuration. The database 1310 may include, but not limited to, a storage area network (SAN) and/or a network attached storage (NAS) system. In some embodiments, the database 1310 is integrated within the computer system 1305. For example, the computer system 1305 may include one or more hard disk drives as the database 1310. In other embodiments, the database 1310 is external to the computer system 1305 and may be accessed by the computer system 1305 using a storage interface 1330. The storage interface 1330 is any component capable of providing the processor 1315 with access to the database 1310. The storage interface 1330 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1315 with access to the database 1310.

The processor 1315 is configured to facilitate processing of the payment transaction request received from the user device 1335 via the communication interface 1325. The processor 1315 is configured to generate a unique ID to be associated with the payment transaction. The processor 1315 is configured to store the unique ID in the database 1310 for later retrieval. The unique ID is stored against the transaction information. The processor 1315 is configured to approve the payment transaction based on performing user authentication, authorization of the user account and debiting of the transaction amount from the user account. The processor 1315 is configured to send a message of payment transaction failure to the user device 1335 upon detection of a broken link with the merchant server.

The processor 1315 is configured to receive a transaction recovery request signal from the user device 1335 via the communication interface 1325. The transaction recovery request signal includes the unique ID associated with payment transaction. The processor 1315 is configured to retrieve the transaction information from the database 1310 as stored against the unique ID in advance. The transaction information includes the transaction status of the payment transaction. In one embodiment, the processor 1315 is also configured to generate a recovery code to be used for initiating the transaction recovery request signal. The processor 1315 is configured to send a confirmation notification signal including the transaction status of the payment transaction as the approved payment transaction to the merchant server via the communication interface 1325 to facilitate completion of the recovered payment transaction.

Figure 14:
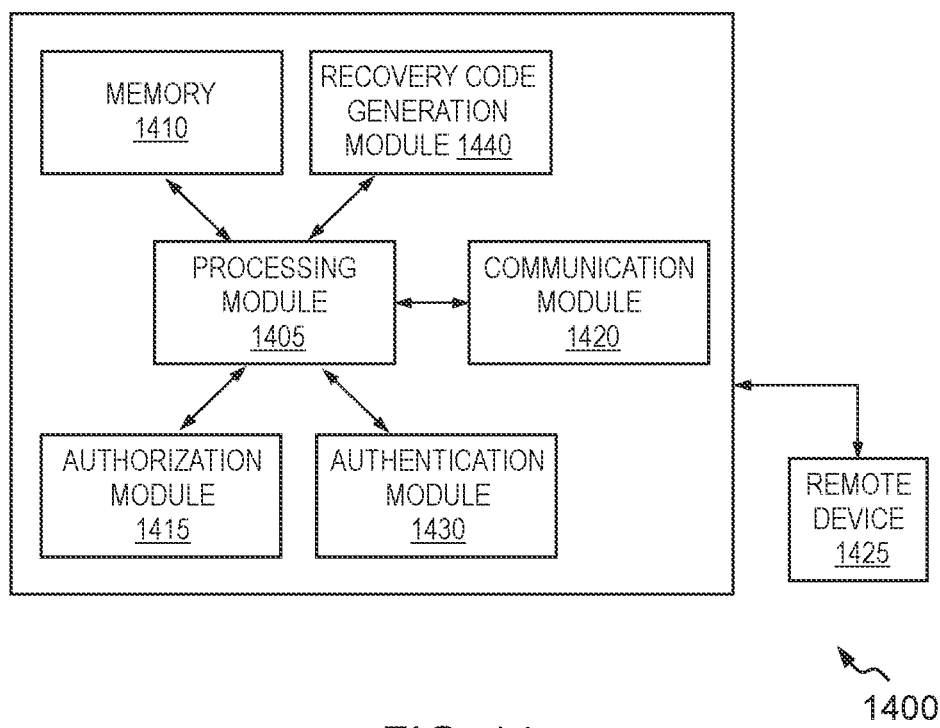
FIG. 14 is a simplified block diagram of an issuer server, in accordance with one embodiment of the present disclosure.

FIG. 14 is a simplified block diagram of an issuer server 1400, in accordance with one embodiment of the present disclosure. The issuer server 1400 is an example of the issuer server 135 of FIG. 1 or may be embodied in the issuer server 135. The issuer server 1400 is associated with an issuer bank/issuer, in which a user may have an account. The issuer server 1400 includes a processing module 1405 operatively coupled to a memory 1410, an authorization module 1415, a communication module 1420, an authentication module 1430 and a recovery code generation module 1440. The components of the issuer server 1400 provided herein may not be exhaustive, and the issuer server 1400 may include more or fewer components than those depicted in FIG. 14. Further, two or more components may be embodied in one single component, and/or one component may be configured using multiple sub-components to achieve the desired functionalities. Some components of the issuer server 1400 may be configured using hardware elements, software elements, firmware elements and/or a combination thereof.

The memory 1410 is configured to store machine executable instructions to be accessed by the processing module 1405. Additionally, the memory 1410 stores information related to, contact information of the user, identification information of the user, bank account number, BICs, payment card details, recovery codes, internet banking information, PIN, mobile personal identification number (MPIN) for mobile banking and the like. The PIN is a four-digit identification code issued by the issuer bank of the user while registering for electronic payment transactions or while issuing the payment card to the user. For example, the PIN may be issued for swipe based transactions, mobile banking, internet banking, payment string based transaction and the like. The PIN is needed to be verified for authentication of the user's identity and association with the issuer bank to process the payment transaction. This information is retrieved by the processing module 1405 for cross-verification during payment transactions via the authentication module 1430.

The processing module 1405, in conjunction with the authorization module 1415, is configured to validate the card information received from the payment server 140 via the communication module 1420. Additionally, the processing module 1405 is configured to verify the sufficient funds in the issuer account and the like. Upon successful authorization of the card information and the authentication of the cardholder only, the payment transaction is processed further by the processing module 1405 by debiting the transaction amount from the issuer account of the user. The processing module 1405 is further configured to communicate with one or more remote devices such as a remote device 1425 using the communication module 1420 over a network such as the communication network 150 or the payment network 145 of FIG. 1. The examples of the remote device 1425 include, the user device 1335, the payment server 140, the acquirer server 130, the payment gateway server 125, the merchant server 120, other computing systems of issuer and the payment network 145 and the like.

The communication module 1420 is capable of facilitating such operative communication with the remote devices and cloud servers using API (Application Program Interface) calls. Via the communication module 1420, the processing module 1405 is configured to send a transaction status notification signal that includes the transaction status of the payment transaction as the approved payment transaction. The recovery code generation module 1440 is configured to generate a recovery code post approving the payment transaction. The recovery code is sent via the communication module 1420 to the user device 1335 and the payment gateway server 125 and/or the acquirer server 130 for use in case of the payment transaction failure during the last leg of the payment transaction.

Figure 15:
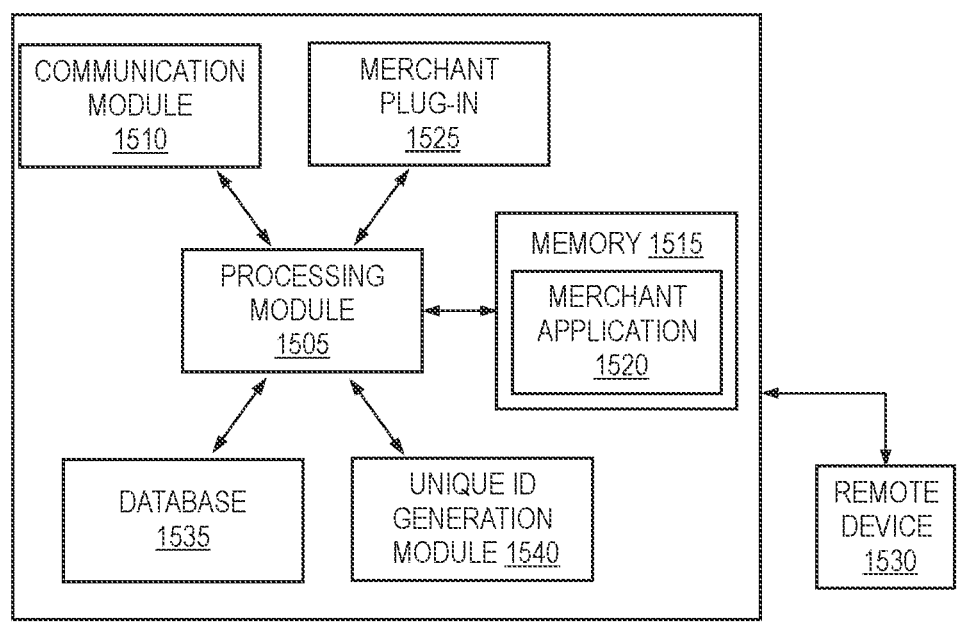
FIG. 15 is a simplified block diagram of a merchant server, in accordance with one embodiment of the present disclosure.

FIG. 15 is a simplified block diagram of a merchant server 1500, in accordance with one embodiment of the present disclosure. The merchant server 1500 is an example of the merchant server 120 of FIG. 1. The merchant server 1500 provides mobile and web merchant applications/e-commerce applications to provide its registered users to purchase goods and services from remote locations by making cardless payments. The merchant server 1500 includes at least one processing module 1505 communicably coupled to a communication module 1510, at least one memory 1515, a Merchant Plug-In (MPI) 1525, a database 1535, and a unique ID generation module 1540. In at least one embodiment, the merchant server 1500 may be accessible to remote devices, such as a remote device 1530, through the communication network 150 or the payment network 145.

The processing module 1505 is capable of executing the stored machine executable instructions of a merchant application 1520 (e.g., the merchant application 202) in the memory 1515 or within the processing module 1505 or any storage location accessible to the processing module 1505. The communication module 1510 is configured to cause display of user interfaces on the remote device 1530 (e.g., the user device 1335). Via the merchant application 1520, the processing module 1505 is configured to provide a plurality of payment methods to the consumer for performing e-commerce transaction. Some non-exhaustive examples of the plurality of payment methods include payment using payment cards, digital tokens, net banking, wallet applications etc.

The MPI 1525 is an ecommerce software module installed on the merchant server 1500. The MPI 1525 assists 3-D secure verifications to help prevent credit card fraud. When a consumer begins an online checkout process, the MPI 1525 identifies the credit card account number the consumer has entered and contacts the card issuer for authorization. The MPI 1525 handles the passing of information from the consumer to the merchant's platform and to the credit card issuer and then back again, making a three-point system of checks and balances to prevent fraud.

In one embodiment, the processing module 1505 electronically facilitates display of one or more UIs of the merchant application 1520 on the user device 1335 via the communication module 1510. A user is enabled to generate a payment transaction request from a UI. Upon receiving the payment transaction request via the communication module 1510, the unique ID generation module 1540 generates a unique ID to be associated with the payment transaction. The unique ID is a combination of a PAN, a transaction date, a transaction time, a payment card number and the transaction amount. The processing module 1505 stores the unique ID in the database 1535 for later retrieval when required. The unique ID generation module 1540 is configured to generate the unique ID dynamically per payment transaction.

In one embodiment, the processing module 1505 receives a transaction recovery request signal initiated from the UI for recovering a payment transaction failed due to a disconnection between the merchant server 1500 and the payment gateway server 125 or the acquirer server 130. The processing module 1505 retrieves the unique ID from the database 1535 to include in the transaction recovery request signal. The user is also enabled to enter a recovery code generated by the issuer server 1400 using the UI of the merchant application 1520 to generate the transaction recovery request signal. The processing module 1505 sends the transaction recovery request signal including the unique ID or the recovery code associated with the payment transaction to the payment gateway server 125 or the acquirer server 130 via the communication module 1510. The processing module 1505 receives a confirmation notification signal including a transaction status of the payment transaction as an approved payment transaction from the payment gateway server 125 or the acquirer server 130. The processing module 1505 electronically facilitates completion of the failed payment transaction. The processing module 1505 notifies the user device 1335 via the merchant application 1520 about successful recovery and completion of the payment transaction. Further, the processing module 1505 is configured to remove the unique ID from the database 1535 when the transaction is successfully recovered.

Figure 16:
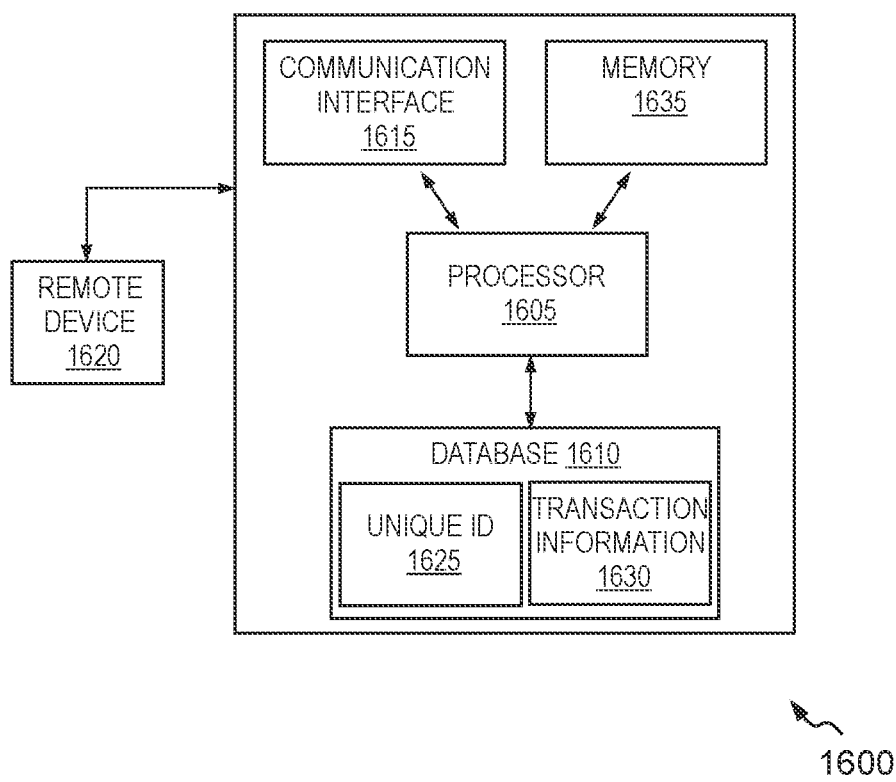
FIG. 16 is a simplified block diagram of acquirer server, in accordance with one embodiment of the present disclosure.

FIG. 16 is a simplified block diagram of an acquirer server 1600, in accordance with one embodiment of the present disclosure. The acquirer server 1600 is associated with the acquirer bank of a merchant where the merchant has established an account to accept payment from the user. The acquirer server 1600 is an example of the acquirer server 130 of FIG. 1 or may be embodied in the acquirer server 130. Further, the acquirer server 1600 is configured to facilitate the recovery of a failed payment transaction as explained with reference to FIG. 10 and FIG. 11. The acquirer server 1600 includes a processor 1605 communicably coupled to a database 1610, a communication interface 1615 and a memory 1635. The components of the acquirer server 1600 provided herein may not be exhaustive, and the acquirer server 1600 may include more or fewer components than those depicted in FIG. 16. Further, two or more components may be embodied in one single component, and/or one component may be configured using multiple sub-components to achieve the desired functionalities. Some components of the acquirer server 1600 may be configured using hardware elements, software elements, firmware elements and/or a combination thereof.

The memory 1635 is configured to store machine executable instructions to be accessed by the processor 1605. The database 1610 includes data related to merchant, such as, but not limited to, a merchant PAN, a merchant name, a merchant category code (MCC), a merchant city, a merchant postal code, a merchant brand name, a merchant ID and the like. The database 1610 also includes a unique ID 1625 stored against a corresponding transaction information 1630 as received from various entities of the payment network 145 such as the merchant server 1500 and the issuer server 1400.

The processor 1605 is configured to use the merchant ID to identify the merchant during the normal processing of payment transactions, adjustments, chargebacks, end-of-month fees and so forth. The merchant ID is different from other merchant account numbers, particularly those that identify merchants to the equipment (e.g., the POS terminals or any other merchant electronic devices) they use for processing transactions. A merchant with a single merchant processing account number may use several terminals at one location, resulting in one merchant ID and several terminal identification numbers (TIDs). The processor 1605 may be configured to store and update such merchant information in the database 1610 for later retrieval.

The processor 1605 is configured to perform the various operations as explained with reference to method 1200. In an embodiment, the communication interface 1615 is capable of facilitating operative communication with a remote device 1620 (e.g., the issuer server 1400, the merchant server 1500, the payment gateway server 125 and/or the payment server 140) using API calls. The communication may be achieved over a communication network, such as the communication network 150. For example, the processor 1605 may receive a payment transaction request signal and/or a transaction recovery request signal from the merchant interface (e.g., an e-commerce website) using the communication interface 1615. The processor 1605 also receives the unique ID 1625 from the merchant server 1500 for storing in the database 1610. The transaction information 1630 includes information such as the transaction amount, a transaction payment method information, the transaction status, and a login ID of the merchant application. The transaction status is sent by the issuer server 1400 after approving the payment transaction.

When a payment transaction fails due to the disconnection between the acquirer server 1600 and the merchant server 1500, the processor 1605 receives a transaction recovery request signal that includes the unique ID 1625 from the merchant server 1500 via the communication interface 1615. The processor 1605 retrieves the transaction information 1630 stored against the unique ID 1625 to identify the transaction status of the payment transaction. Via the communication interface 1615, the processor 1605 sends a confirmation notification signal to the merchant server 1500 to facilitate recovery and completion of the failed payment transaction. Further, the processor 1605 is configured to receive the debited transaction amount from the payment server 140 or the issuer server 135 (or the issuer server 1400) via the communication interface 1615. Thereafter, the processor 1605 may retrieve merchant PAN from the database 1610 to credit the transaction amount in the acquirer account of the merchant. Further, the processor 1605 may be configured to send the transaction status to the merchant device of the merchant and the user device 1335.

Figure 17:
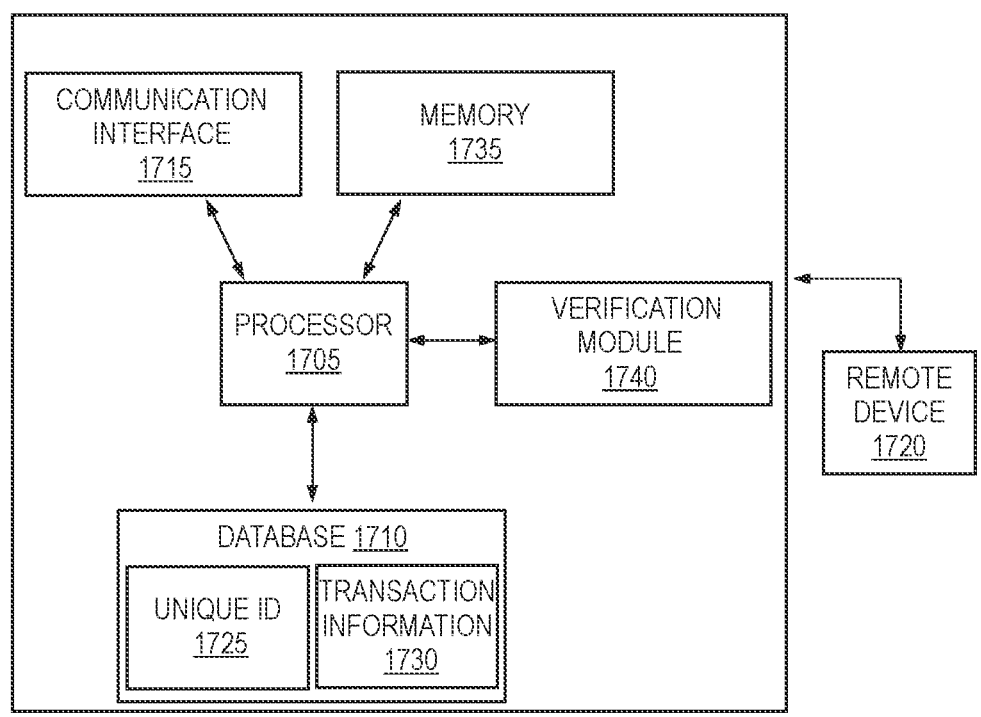
FIG. 17 is a simplified block diagram of a payment gateway server, in accordance with one embodiment of the present disclosure.

FIG. 17 is a simplified block diagram of a payment gateway server 1700, in accordance with one embodiment of the present disclosure. Typically, a payment gateway/PSP can connect to multiple acquiring banks, card, and payment networks. In many cases, the payment gateway server fully manages these technical connections, relationships with the external network, and bank accounts. This makes the merchant less dependent on financial institutions and free from the task of establishing these connections directly. The payment gateway server 1700 is configured to facilitate the recovery of a failed payment transaction. The payment gateway server 1700 includes a processor 1705 communicably coupled to a database 1710, a communication interface 1715, a memory 1735 and a verification module 1740. The components of the payment gateway server 1700 provided herein may not be exhaustive, and that the payment gateway server 1700 may include more or fewer components than those depicted in FIG. 17. Further, two or more components may be embodied in one single component, and/or one component may be configured using multiple sub-components to achieve the desired functionalities. Some components of the payment gateway server 1700 may be configured using hardware elements, software elements, firmware elements and/or a combination thereof.

The memory 1735 is configured to store machine executable instructions to be accessed by the processor 1705. For example, the memory 1735 may include volatile or non-volatile memories, or a combination thereof. In some non-limiting examples, the memory 1735 can be four to sixty-four Megabytes (MB) of Dynamic Random Access Memory ("DRAM") or Static Random Access Memory ("SRAM"). In addition, some examples may include supplementary flash memory installed via a PCMCIA slot.

The database 1710 includes data related to merchant, acquirer, issuer, payment network etc. The database 1710 also includes a unique ID 1725 stored against a corresponding transaction information 1730 as received from various entities of the payment network 145 such as the merchant server 1500 and the acquirer server 1600. The database 1710 includes payment method information related to the user, such as, but not limited to, wallet application information, payment cards, etc.

In an embodiment, the processor 1705 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The processor 1705 is configured to perform the various operations as explained with reference to method 1200. In an embodiment, the communication interface 1715 is capable of facilitating operative communication with a remote device 1720 (e.g., the issuer server 1400, the merchant server 1500, and/or the payment server 140) using API calls. The communication may be achieved over a communication network, such as the network 150. The communication interface 1715 is further configured to cause display of user interfaces on the remote device 1720 (e.g., the user device 1335). In one embodiment, the communication interface 1715 includes a transceiver for wirelessly communicating information to, or receiving information from, the remote device 1720 or other suitable display device, and/or another type of remote processing device.

In one embodiment, the processor 1705 receives a payment transaction request signal and/or a transaction recovery request signal from the merchant server 1500 using the communication interface 1715. The processor 1705 also receives the unique ID 1725 from the merchant server 1500 for storing in the database 1710. The transaction information 1730 includes information such as the transaction amount, a transaction payment method information, the transaction status and the like. The transaction status is sent by the issuer server 1400 after approving the payment transaction. When a payment transaction fails due to the disconnection between the payment gateway server 1700 and the merchant server 1500, the processor 1705 receives a transaction recovery request signal that includes the unique ID 1725 from the merchant server 1500 via the communication interface 1715. Via the verification module 1740, the unique ID is verified. Thereafter, the processor 1705 retrieves the transaction information 1730 stored against the unique ID 1725 to identify the transaction status of the payment transaction. Via the communication interface 1715, the processor 1705 sends a confirmation notification signal to the merchant server 1500 to facilitate recovery and completion of the failed payment transaction.

Figure 18:
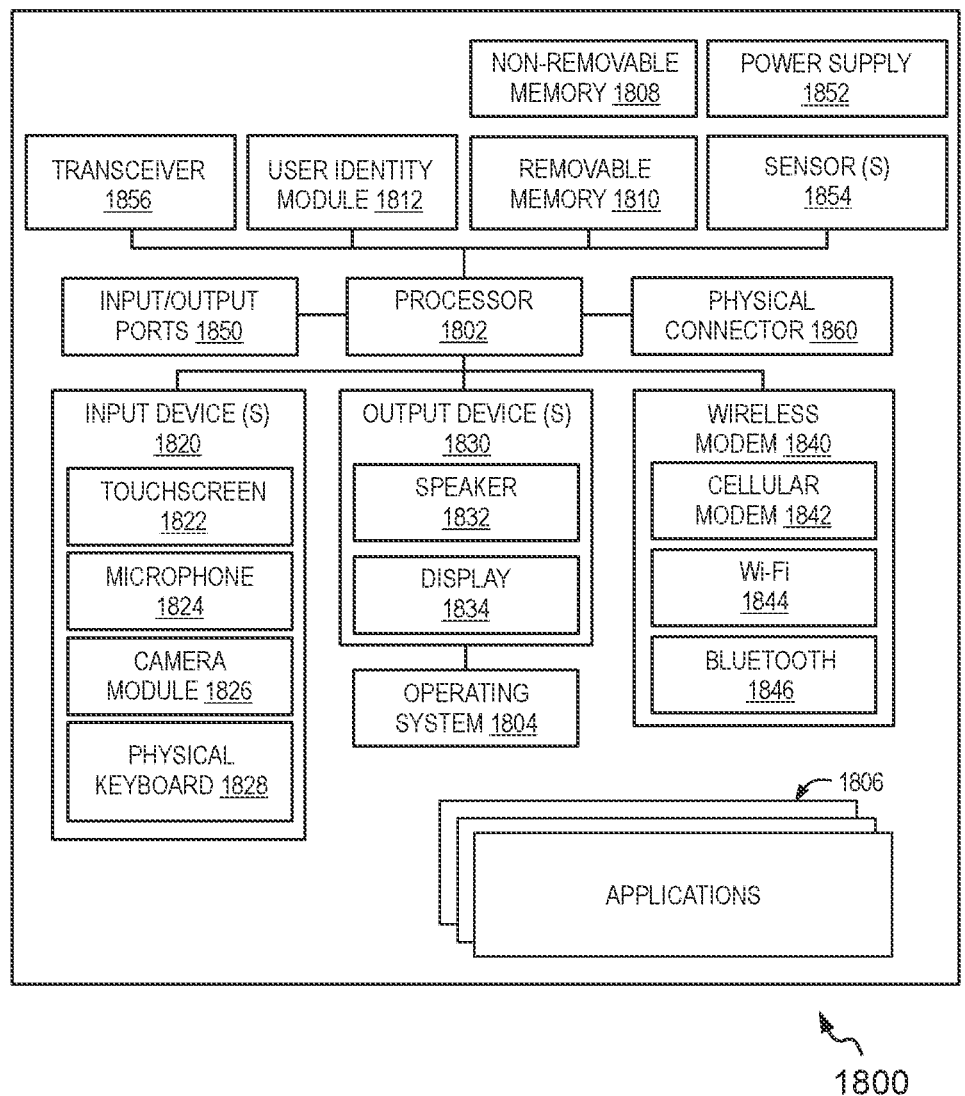
FIG. 18 is a simplified block diagram of a user device capable of implementing at least some embodiments of the present disclosure.

FIG. 18 shows simplified block diagram of a user device 1800 capable of implementing the various embodiments of the present disclosure. For example, the user device 1800 may correspond to the user device 102 of FIG. 1. The user device 1800 is depicted to include one or more applications, such as a merchant application, a wallet application or a payment application. The applications are capable of communicating with any of the servers 120, 125, 130, 135, and 140 for recovering a failed e-commerce transaction.

It should be understood that the user device 1800 as illustrated and hereinafter described is merely illustrative of one type of device and should not be taken to limit the scope of the embodiments. As such, it should be appreciated that at least some of the components described below in connection with the user device 1800 may be optional and thus in an example embodiment may include more, less or different components than those described in connection with the example embodiment of the FIG. 18. As such, among other examples, the user device 1800 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1800 includes a controller or a processor 1802 (e.g., a signal processor, microprocessor, ASIC, or other control and processing logic circuitry) for performing tasks such as signal coding, data processing, image processing, input/output processing, power control, and/or other functions. An operating system 1804 controls the allocation and usage of the components of the user device 1800 and supports for one or more payment application programs (see, applications 1806), that implements one or more of the innovative features as described herein. In addition, the applications 1806 may include common mobile computing applications (e.g., telephony applications, email applications, calendars, contact managers, web browsers, messaging applications) or any other computing application.

The illustrated user device 1800 includes one or more memory components, for example, a non-removable memory 1808 and/or a removable memory 1810. The non-removable memory 1808 and/or the removable memory 1810 may be collectively known as database in an embodiment. The non-removable memory 1808 can include RAM, ROM, flash memory, a hard disk, or other well-known memory storage technologies. The removable memory 1810 can include flash memory, smart cards, or a Subscriber Identity Module (SIM). The one or more memory components can be used for storing data and/or code for running the operating system 1804 and the applications 1806. The user device 1800 may further include a user identity module (UIM) 1812. The UIM 1812 may be a memory device having a processor built in. The UIM 1812 may include, for example, a subscriber identity module (SIM), a universal integrated circuit card (UICC), a universal subscriber identity module (USIM), a removable user identity module (R-UIM), or any other smart card. The UIM 1812 typically stores information elements related to a mobile subscriber. The UIM 1812 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1800 can support one or more input devices 1820 and one or more output devices 1830. Examples of the input devices 1820 may include, but are not limited to, a touch screen/a display screen 1822 (e.g., capable of capturing finger tap inputs, finger gesture inputs, multi-finger tap inputs, multi-finger gesture inputs, or keystroke inputs from a virtual keyboard or keypad), a microphone 1824 (e.g., capable of capturing voice input), a camera module 1826 (e.g., capable of capturing still picture images and/or video images) and a physical keyboard 1828. Examples of the output devices 1830 may include but are not limited to a speaker 1832 and a display 1834. Other possible output devices can include piezoelectric or other haptic output devices. Some devices can serve more than one input/output function. For example, the touch screen 1822 and the display 1834 can be combined into a single input/output device.

A wireless modem 1840 can be coupled to one or more antennas (not shown in the FIG. 18) and can support two-way communications between the processor 1802 and external devices, as is well understood in the art. The wireless modem 1840 is shown generically and can include, for example, a cellular modem 1842 for communicating at long range with the mobile communication network, a Wi-Fi compatible modem 1844 for communicating at short range with an external Bluetooth-equipped device or a local wireless data network or router, and/or a Bluetooth-compatible modem 1846. The wireless modem 1840 is typically configured for communication with one or more cellular networks, such as a GSM network for data and voice communications within a single cellular network, between cellular networks, or between the user device 1800 and a public switched telephone network (PSTN).

The user device 1800 can further include one or more input/output ports 1850, a power supply 1852, one or more sensors 1854 for example, an accelerometer, a gyroscope, a compass, or an infrared proximity sensor for detecting the orientation or motion of the user device 1800 and biometric sensors for scanning biometric identity of an authorized user, a transceiver 1856 (for wirelessly transmitting analog or digital signals) and/or a physical connector 1860, which can be a USB port, IEEE 1294 (FireWire) port, and/or RS-232 port. The illustrated components are not required or all-inclusive, as any of the components shown can be deleted and other components can be added.

The disclosed method with reference to FIG. 12, or one or more operations of the method 1200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 1300 and its various components such as the computer system 1305 and the database 1310 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A computer-implemented method, the method comprising:
   receiving, by a payment network server system from a merchant server, a payment transaction request and a first unique Identifier (ID) associated with the payment transaction request, the payment transaction request including transaction information associated with a payment transaction, the transaction information including a transaction amount;
   storing, by the server, the first unique ID and the transaction information in a database;
   receiving, by the server system from the merchant server, a transaction recovery request signal initiated from a User Interface (UI) of a merchant application running on a user device, the transaction recovery request signal comprising a second unique Identifier (ID) associated with the payment transaction, the payment transaction having failed due to a disconnection between the server system and the merchant server;
   determining, by the server system, that the second unique ID matches the first unique ID stored in the database;
   based on the match, electronically retrieving, by the server system, the transaction information stored against the first unique ID, wherein the transaction information comprises a transaction status of the payment transaction;
   identifying, by the server system, the transaction status of the payment transaction as an approved payment transaction; and
   sending, by the server system, a confirmation notification signal comprising the transaction status of the payment transaction as the approved payment transaction to the merchant server, wherein the merchant server completes the payment transaction failed due to the disconnection between the server system and the merchant server based on the confirmation notification signal received from the server system.

2. The method as claimed in claim 1, wherein the server system is one of a payment gateway server and an acquirer server.

3. The method as claimed in claim 2, the method further comprising:
   receiving a recovery code from an issuer server; and
   storing the recovery code against the corresponding transaction information of the payment transaction.

4. The method as claimed in claim 3, further comprising:
   receiving the recovery code entered on the UI of the merchant application to initiate the transaction recovery request signal, wherein the recovery code is sent to the user device via a notification message signal along with the transaction status of the payment transaction by the issuer server.

5. The method as claimed in claim 3, wherein the payment transaction is approved based on performing by the issuer server, each of:
   a successful authentication of a user,
   a successful authorization of a user account,
   a debiting of the transaction amount from the user account, and
   sending a transaction status notification signal comprising the transaction status of the payment transaction as the approved payment transaction.

6. The method as claimed in claim 2, wherein each of the first and second unique ID is a combination of a Primary Account Number (PAN), a transaction date, a transaction time, and the transaction amount.

7. The method as claimed in claim 2, wherein the first unique ID is dynamically generated by the merchant server for the payment transaction based on one or more attributes.

8. The method as claimed in claim 2, wherein each of the first and second unique ID is discarded upon completion of the payment transaction.

9. The method as claimed in claim 2, wherein the transaction information comprises the transaction amount, a transaction payment method information, the transaction status, and a login ID associated with a user of the merchant application.

10. A server system in a payment network, the server system comprising:
    a communication interface configured to:
       receive, from a merchant server, a payment transaction request and a first unique Identifier (ID) associated with the payment transaction request, the payment transaction request including transaction information associated with a payment transaction, the transaction information including a transaction amount; and
       receive, from the merchant server, a transaction recovery request signal initiated from a User Interface (UI) of a merchant application running on a user device, the transaction recovery request signal comprising a second unique Identifier (ID) associated with the payment transaction, the payment transaction having failed due to a disconnection between the server system and the merchant server;
    a database;
    a memory comprising executable instructions; and
    a processor communicably coupled to the database and the communication interface, the processor configured to execute the instructions to cause the server system to at least:
       store the first unique ID and the transaction information in a database;
       determine that the second unique ID matches the first unique ID stored in the database;
       based on the match, electronically retrieve the transaction information stored against the first unique ID, wherein the transaction information comprises a transaction status of the payment transaction;
       identify the transaction status of the payment transaction as an approved payment transaction; and
       send a confirmation notification signal comprising the transaction status of the payment transaction as the approved payment transaction to the merchant server, wherein the merchant server completes the payment transaction failed due to the disconnection between the server system and the merchant server based on the confirmation notification signal received from the server system.

11. The server system as claimed in claim 10, wherein the server system is one of a payment gateway server and an acquirer server.

12. The server system as claimed in claim 11, wherein the server system is further caused at least in part to:
    receive a recovery code from an issuer server; and
    store the recovery code against the corresponding transaction information of the payment transaction.

13. The server system as claimed in claim 12, wherein the server system is further caused at least in part to:
    receive the recovery code entered on the UI of the merchant application to initiate the transaction recovery request signal, wherein the recovery code is sent to the user device via a notification message signal along with the transaction status of the payment transaction by the issuer server.

14. The server system as claimed in claim 12, wherein the payment transaction is approved based on performing by the issuer server, each of:
    a successful authentication of a user,
    a successful authorization of a user account,
    a debiting of the transaction amount from the user account, and
    sending a transaction status notification signal comprising the transaction status of the payment transaction as the approved payment transaction.

15. The server system as claimed in claim 11, wherein each of the first and second unique ID is a combination of a Primary Account Number (PAN), a transaction date, a transaction time and the transaction amount.

16. The server system as claimed in claim 11, wherein the first unique ID is dynamically generated by the merchant server for the payment transaction.

17. The server system as claimed in claim 11, wherein each of the first and second unique ID is removed upon completion of the payment transaction.

18. The server system as claimed in claim 11, wherein the transaction information comprises the transaction amount, a transaction payment method information, the transaction status, and a login ID associated with a user of the merchant application.

19. A server system in a payment network, the server system comprising:
    a communication module configured to:
       electronically facilitate display of a User Interface (UI) of a merchant application on a user device;
       receive a payment transaction request from the merchant application, the payment transaction request including transaction information associated with a payment transaction, the transaction information including a transaction amount, a transaction date, and a transaction time; and
       receive, from the merchant application, a transaction recovery request signal initiated from the UI, the transaction recovery request signal comprising a second unique Identifier (ID) associated with the payment transaction, the payment transaction having failed due to a disconnection between the server system and a payment gateway server;
    a memory comprising executable instructions; and
    a processing module communicably coupled to the communication module and configured to execute the instructions to cause the server system to at least:

generate a first unique Identifier (ID) associated with the payment transaction request, the first unique ID comprising a combination of a Primary Account Number (PAN), the transaction date, the transaction time, and the transaction amount;

transmit the payment transaction request and the first unique ID associated with the payment transaction request to the payment gateway server;

add the first unique ID to the received transaction recovery request signal;

send the transaction recovery request signal comprising the first unique ID to the payment gateway server;

receive a confirmation notification signal comprising a transaction status of the payment transaction as an approved payment transaction from the payment gateway server, wherein the payment gateway server is configured to electronically retrieve a corresponding transaction information stored against the unique ID, the transaction information comprising the transaction status of the payment transaction; and electronically completion of complete the payment transaction failed due to the disconnection between the server system and the payment gateway server by capturing the payment transaction, based on receiving the confirmation notification signal from the payment gateway server.

20. The server system as claimed in claim 19, wherein the unique ID is dynamically generated and wherein the unique ID is removed upon the completion of the payment transaction.

\* \* \* \* \*